US010963966B1

(12) United States Patent
Brandmaier et al.

(10) Patent No.: US 10,963,966 B1
(45) Date of Patent: Mar. 30, 2021

(54) ELECTRONIC EXCHANGE OF INSURANCE INFORMATION

(71) Applicant: Allstate Insurance Company, Northbrook, IL (US)

(72) Inventors: Jennifer A. Brandmaier, Chicago, IL (US); James Gillespie, Belfast (GB); Stephen Hughes, Belfast (GB); Daniel Koza, Hinsdale, IL (US); William Loo, Arlington Heights, IL (US); Francis Lowry, Clogher (GB)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/039,722

(22) Filed: Sep. 27, 2013

(51) Int. Cl.
*G06Q 40/08* (2012.01)
*G06Q 10/10* (2012.01)

(52) U.S. Cl.
CPC ............. *G06Q 40/08* (2013.01); *G06Q 10/10* (2013.01)

(58) Field of Classification Search
None
See application file for complete search history.

(56) References Cited

U.S. PATENT DOCUMENTS

| 4,638,289 A | 1/1987 | Zottnik |
| 5,450,329 A | 9/1995 | Tanner |
| 5,742,699 A | 4/1998 | Adkins et al. |
| 5,950,169 A | 9/1999 | Borghesi et al. |
| 6,060,989 A | 5/2000 | Gehlot |

(Continued)

FOREIGN PATENT DOCUMENTS

| AU | 2002301438 B2 | 9/2006 |
| AU | 2007200869 A1 | 3/2007 |

(Continued)

OTHER PUBLICATIONS

"Automatic License Plate Recognition (ALPR) Scanning Systems." Retrieved from <http://www.experiencedcriminallawyers.com/articles/automatic-license-plate-recognition-alpr-scanning-systems> on Jun. 28, 2013.

(Continued)

*Primary Examiner* — William J Jacob
(74) *Attorney, Agent, or Firm* — Banner & Witcoff, Ltd.

(57) ABSTRACT

Systems, devices, and methods described herein are directed towards sharing and exchanging insurance information between individuals. An insurance application is provided to a mobile computing device, and the insurance application is configured to transmit insurance information to another mobile computing device. Transmission of insurance information from the mobile computing device to the other mobile computing device may be initiated using the insurance application. A message may be generated that indicates the insurance information was transmitted from the mobile computing device to the other mobile computing device. The message may be sent to an insurance system, and receipt of the message at the insurance system may cause the insurance system to respond to the transmission of insurance information from the mobile device to the other mobile device. The transmission of insurance information may be initiated in response to a bump gesture performed between the mobile device and the other mobile device.

18 Claims, 10 Drawing Sheets

(56) References Cited

U.S. PATENT DOCUMENTS

| | | | |
|---|---|---|---|
| 6,061,610 | A | 5/2000 | Boer |
| 6,076,028 | A | 6/2000 | Donnelly et al. |
| 6,141,611 | A | 10/2000 | Mackey et al. |
| 6,211,777 | B1 | 4/2001 | Greenwood et al. |
| 6,246,933 | B1 | 6/2001 | Bague |
| 6,262,657 | B1 | 7/2001 | Okuda et al. |
| 6,295,492 | B1 | 9/2001 | Lang et al. |
| 6,330,499 | B1 | 12/2001 | Chou et al. |
| 6,472,982 | B2 | 10/2002 | Eida et al. |
| 6,509,868 | B2 | 1/2003 | Flick |
| 6,594,579 | B1 | 7/2003 | Lowrey et al. |
| 6,611,740 | B2 | 8/2003 | Lowrey et al. |
| 6,641,038 | B2 | 11/2003 | Gehlot |
| 6,701,234 | B1 | 3/2004 | Vogelsang |
| 6,732,020 | B2 | 5/2004 | Yamagishi |
| 6,732,031 | B1 | 5/2004 | Lightner et al. |
| 6,741,168 | B2 | 5/2004 | Webb et al. |
| 6,762,020 | B1 | 7/2004 | Mack et al. |
| 6,765,499 | B2 | 7/2004 | Flick |
| 6,798,356 | B2 | 9/2004 | Flick |
| 6,909,947 | B2 | 6/2005 | Douros et al. |
| 6,925,425 | B2 | 8/2005 | Remboski et al. |
| 6,946,966 | B2 | 9/2005 | Koenig |
| 6,980,313 | B2 | 12/2005 | Sharif et al. |
| 6,982,654 | B2 | 1/2006 | Rau et al. |
| 6,988,033 | B1 | 1/2006 | Lowrey et al. |
| 7,069,118 | B2 | 6/2006 | Coletrane et al. |
| 7,082,359 | B2 | 7/2006 | Breed |
| 7,092,803 | B2 | 8/2006 | Kapolka et al. |
| 7,113,127 | B1 | 9/2006 | Banet et al. |
| 7,119,669 | B2 | 10/2006 | Lundsgaard et al. |
| 7,129,826 | B2 | 10/2006 | Nitz et al. |
| 7,133,661 | B2 | 11/2006 | Hatae et al. |
| 7,143,290 | B1 | 11/2006 | Ginter et al. |
| 7,155,259 | B2 | 12/2006 | Bauchot et al. |
| 7,155,321 | B2 | 12/2006 | Bromley et al. |
| 7,174,243 | B1 | 2/2007 | Lightner et al. |
| 7,271,716 | B2 | 9/2007 | Nou |
| 7,305,293 | B2 | 12/2007 | Flick |
| 7,348,895 | B2 | 3/2008 | Lagassey |
| 7,477,968 | B1 | 1/2009 | Lowrey et al. |
| 7,565,230 | B2 | 7/2009 | Gardner et al. |
| 7,671,727 | B2 | 3/2010 | Flick |
| 7,702,529 | B2 | 4/2010 | Wahlbin et al. |
| 7,715,961 | B1 | 5/2010 | Kargupta |
| 7,747,365 | B1 | 6/2010 | Lowrey et al. |
| 7,792,690 | B2 | 9/2010 | Wahlbin et al. |
| 7,809,586 | B2 | 10/2010 | Wahlbin et al. |
| 7,885,829 | B2 | 2/2011 | Danico et al. |
| 7,890,355 | B2 | 2/2011 | Gay et al. |
| 7,970,834 | B2 | 6/2011 | Daniels et al. |
| 8,000,979 | B2 | 8/2011 | Blom |
| 8,014,789 | B2 | 9/2011 | Breed |
| 8,019,629 | B1 | 9/2011 | Medina, III et al. |
| 8,041,635 | B1 | 10/2011 | Garcia et al. |
| 8,069,060 | B2 | 11/2011 | Tipirneni |
| 8,090,598 | B2 | 1/2012 | Bauer et al. |
| 8,140,358 | B1 | 3/2012 | Ling et al. |
| 8,214,100 | B2 | 7/2012 | Lowrey et al. |
| 8,229,759 | B2 | 7/2012 | Zhu et al. |
| 8,239,220 | B2 | 8/2012 | Kidd et al. |
| 8,255,243 | B2 | 8/2012 | Raines et al. |
| 8,255,275 | B2 | 8/2012 | Collopy et al. |
| 8,260,639 | B1 | 9/2012 | Medina, III et al. |
| 8,271,187 | B2 | 9/2012 | Taylor et al. |
| 8,285,588 | B2 | 10/2012 | Postrel |
| 8,311,858 | B2 | 11/2012 | Everett et al. |
| 8,321,086 | B2 | 11/2012 | Park et al. |
| 8,330,593 | B2 | 12/2012 | Golenski |
| 8,364,505 | B1 | 1/2013 | Kane et al. |
| 8,370,254 | B1 | 2/2013 | Hopkins, III et al. |
| 8,392,280 | B1 | 3/2013 | Kilshaw |
| 8,401,877 | B2 | 3/2013 | Salvagio |
| 8,403,225 | B2 | 3/2013 | Sharra et al. |
| 8,417,604 | B2 | 4/2013 | Orr et al. |
| 8,423,239 | B2 | 4/2013 | Blumer et al. |
| 8,432,262 | B2 | 4/2013 | Talty et al. |
| 8,433,590 | B2 | 4/2013 | Prescott |
| 8,438,049 | B2 | 5/2013 | Ranicar, III et al. |
| 8,442,508 | B2 | 5/2013 | Harter et al. |
| 8,447,459 | B2 | 5/2013 | Lowrey et al. |
| 8,452,486 | B2 | 5/2013 | Banet et al. |
| 8,463,488 | B1 | 6/2013 | Hart |
| 8,466,781 | B2 | 6/2013 | Miller et al. |
| 8,478,514 | B2 | 7/2013 | Kargupta |
| 8,484,113 | B2 | 7/2013 | Collopy et al. |
| 8,494,938 | B1 | 7/2013 | Kazenas |
| 8,510,133 | B2 | 8/2013 | Peak et al. |
| 8,510,200 | B2 | 8/2013 | Pearlman et al. |
| 8,527,135 | B2 | 9/2013 | Lowrey et al. |
| 8,547,435 | B2 | 10/2013 | Mimar |
| 8,554,584 | B2 | 10/2013 | Hargroder |
| 8,571,895 | B1 | 10/2013 | Medina, III et al. |
| 8,577,703 | B2 | 11/2013 | McClellan et al. |
| 8,595,034 | B2 | 11/2013 | Bauer et al. |
| 8,598,977 | B2 | 12/2013 | Maalouf et al. |
| 8,620,692 | B2 | 12/2013 | Collopy et al. |
| 8,630,768 | B2 | 1/2014 | McClellan et al. |
| 8,633,985 | B2 | 1/2014 | Haynes et al. |
| 8,635,091 | B2 | 1/2014 | Amigo et al. |
| 8,645,014 | B1 | 2/2014 | Kozlowski et al. |
| 8,712,893 | B1 | 4/2014 | Brandmaier et al. |
| 8,788,297 | B2 | 7/2014 | Thomas et al. |
| 8,788,301 | B1 | 7/2014 | Marlow et al. |
| 8,788,406 | B2 | 7/2014 | Roll et al. |
| 8,799,034 | B1 | 8/2014 | Brandmaier et al. |
| 8,903,852 | B1 | 12/2014 | Pedregal et al. |
| 8,935,036 | B1 * | 1/2015 | Christensen ........... G06Q 40/08 |
| | | | 701/29.1 |
| 9,311,677 | B2 | 4/2016 | Thomas et al. |
| 9,325,807 | B1 | 4/2016 | Meoli et al. |
| 10,102,587 | B1 | 10/2018 | Potter et al. |
| 2002/0055861 | A1 | 5/2002 | King et al. |
| 2002/0063637 | A1 | 5/2002 | Eida et al. |
| 2002/0111725 | A1 | 8/2002 | Burge |
| 2002/0135679 | A1 | 9/2002 | Scaman |
| 2003/0154111 | A1 | 8/2003 | Dutra et al. |
| 2003/0212567 | A1 | 11/2003 | Shintani et al. |
| 2003/0233261 | A1 | 12/2003 | Kawahara et al. |
| 2004/0083123 | A1 | 4/2004 | Kim et al. |
| 2004/0088090 | A1 | 5/2004 | Wee |
| 2004/0186744 | A1 | 9/2004 | Lux |
| 2004/0189493 | A1 | 9/2004 | Estus et al. |
| 2004/0205622 | A1 * | 10/2004 | Jones et al. .................... 715/523 |
| 2005/0021374 | A1 | 1/2005 | Allahyari |
| 2005/0161505 | A1 | 7/2005 | Yin et al. |
| 2005/0216487 | A1 | 9/2005 | Fisher et al. |
| 2005/0267774 | A1 | 12/2005 | Merritt et al. |
| 2005/0278082 | A1 | 12/2005 | Weekes |
| 2006/0224305 | A1 | 10/2006 | Ansari |
| 2006/0226960 | A1 | 10/2006 | Pisz et al. |
| 2007/0009136 | A1 | 1/2007 | Pawlenko et al. |
| 2007/0043594 | A1 * | 2/2007 | Lavergne ........................ 705/2 |
| 2007/0136162 | A1 | 6/2007 | Thibodeau et al. |
| 2007/0162308 | A1 | 7/2007 | Peters |
| 2007/0288268 | A1 | 12/2007 | Weeks |
| 2008/0027761 | A1 * | 1/2008 | Bracha ........................... 705/4 |
| 2008/0242261 | A1 | 10/2008 | Shimanuki et al. |
| 2008/0294690 | A1 | 11/2008 | McClellan et al. |
| 2009/0106052 | A1 | 4/2009 | Moldovan |
| 2009/0156243 | A1 | 6/2009 | Lichtenfeld et al. |
| 2009/0164504 | A1 | 6/2009 | Flake et al. |
| 2009/0198772 | A1 | 8/2009 | Kim et al. |
| 2009/0254241 | A1 | 10/2009 | Basir |
| 2009/0265193 | A1 | 10/2009 | Collins et al. |
| 2009/0265385 | A1 | 10/2009 | Beland et al. |
| 2010/0030540 | A1 | 2/2010 | Choi et al. |
| 2010/0030586 | A1 | 2/2010 | Taylor et al. |
| 2010/0131300 | A1 | 5/2010 | Collopy et al. |
| 2010/0138242 | A1 | 6/2010 | Ferrick et al. |
| 2010/0161491 | A1 * | 6/2010 | Bauchot et al. ................. 705/50 |
| 2010/0174564 | A1 * | 7/2010 | Stender et al. .................... 705/4 |
| 2011/0015946 | A1 | 1/2011 | Buckowsky et al. |
| 2011/0070834 | A1 | 3/2011 | Griffin et al. |

(56) References Cited

U.S. PATENT DOCUMENTS

| | | |
|---|---|---|
| 2011/0077028 A1 | 3/2011 | Wilkes, III et al. |
| 2011/0112870 A1* | 5/2011 | Berg .................... G06Q 40/08 705/4 |
| 2011/0153369 A1* | 6/2011 | Feldman et al. .................. 705/4 |
| 2011/0161116 A1* | 6/2011 | Peak et al. .................. 705/4 |
| 2011/0161118 A1* | 6/2011 | Borden et al. .................. 705/4 |
| 2011/0185178 A1 | 7/2011 | Gotthardt |
| 2011/0281564 A1 | 11/2011 | Armitage et al. |
| 2011/0307188 A1 | 12/2011 | Peng et al. |
| 2011/0313936 A1 | 12/2011 | Sieger |
| 2012/0028680 A1 | 2/2012 | Breed |
| 2012/0047203 A1 | 2/2012 | Brown et al. |
| 2012/0072243 A1 | 3/2012 | Collins et al. |
| 2012/0076437 A1 | 3/2012 | King |
| 2012/0084179 A1 | 4/2012 | McRae et al. |
| 2012/0109690 A1 | 5/2012 | Weinrauch et al. |
| 2012/0109692 A1 | 5/2012 | Collins et al. |
| 2012/0119936 A1 | 5/2012 | Miller et al. |
| 2012/0136802 A1 | 5/2012 | McQuade et al. |
| 2012/0150412 A1 | 6/2012 | Yoon et al. |
| 2012/0191476 A1 | 7/2012 | Reid et al. |
| 2012/0197486 A1 | 8/2012 | Elliott |
| 2012/0197669 A1 | 8/2012 | Kole et al. |
| 2012/0209631 A1 | 8/2012 | Roscoe et al. |
| 2012/0209632 A1 | 8/2012 | Kaminski et al. |
| 2012/0230548 A1 | 9/2012 | Calman et al. |
| 2012/0232995 A1 | 9/2012 | Castro et al. |
| 2012/0239417 A1 | 9/2012 | Pourfallah et al. |
| 2012/0242503 A1 | 9/2012 | Thomas et al. |
| 2012/0250938 A1 | 10/2012 | DeHart |
| 2012/0259665 A1 | 10/2012 | Pandhi et al. |
| 2012/0290150 A1 | 11/2012 | Doughty et al. |
| 2012/0303392 A1 | 11/2012 | Depura et al. |
| 2012/0316893 A1 | 12/2012 | Egawa |
| 2012/0330687 A1 | 12/2012 | Hilario et al. |
| 2013/0006674 A1 | 1/2013 | Bowne et al. |
| 2013/0006675 A1 | 1/2013 | Bowne et al. |
| 2013/0018676 A1 | 1/2013 | Fischer et al. |
| 2013/0030642 A1* | 1/2013 | Bradley .................. G07C 5/085 701/32.2 |
| 2013/0033386 A1 | 2/2013 | Zlojutro |
| 2013/0035964 A1 | 2/2013 | Roscoe et al. |
| 2013/0046510 A1 | 2/2013 | Bowne et al. |
| 2013/0054274 A1 | 2/2013 | Katyal |
| 2013/0073318 A1 | 3/2013 | Feldman et al. |
| 2013/0073321 A1 | 3/2013 | Hofmann et al. |
| 2013/0138267 A1 | 5/2013 | Hignite et al. |
| 2013/0151288 A1 | 6/2013 | Bowne et al. |
| 2013/0166098 A1 | 6/2013 | Lavie et al. |
| 2013/0166326 A1 | 6/2013 | Lavie et al. |
| 2013/0179027 A1 | 7/2013 | Mitchell |
| 2013/0179198 A1 | 7/2013 | Bowne et al. |
| 2013/0190967 A1 | 7/2013 | Hassib et al. |
| 2013/0197945 A1 | 8/2013 | Anderson |
| 2013/0204645 A1* | 8/2013 | Lehman et al. .................. 705/4 |
| 2013/0211660 A1 | 8/2013 | Mitchell |
| 2013/0226397 A1 | 8/2013 | Kuphal et al. |
| 2013/0289819 A1 | 10/2013 | Hassib et al. |
| 2013/0290036 A1 | 10/2013 | Strange |
| 2013/0297353 A1 | 11/2013 | Strange et al. |
| 2013/0297418 A1 | 11/2013 | Collopy et al. |
| 2013/0300552 A1 | 11/2013 | Chang |
| 2013/0304517 A1 | 11/2013 | Florence |
| 2013/0311209 A1 | 11/2013 | Kaminski et al. |
| 2013/0316310 A1 | 11/2013 | Musicant et al. |
| 2013/0317860 A1 | 11/2013 | Schumann, Jr. |
| 2013/0339062 A1 | 12/2013 | Brewer et al. |
| 2014/0025404 A1 | 1/2014 | Jackson et al. |
| 2014/0039934 A1 | 2/2014 | Rivera |
| 2014/0039935 A1* | 2/2014 | Rivera .................. G06Q 40/08 705/4 |
| 2014/0058956 A1 | 2/2014 | Raines et al. |
| 2014/0081673 A1 | 3/2014 | Batchelor |
| 2014/0081675 A1 | 3/2014 | Ives et al. |
| 2014/0081876 A1 | 3/2014 | Schulz |
| 2014/0100889 A1 | 4/2014 | Tofte |
| 2014/0111542 A1 | 4/2014 | Wan |
| 2014/0197939 A1 | 7/2014 | Stefan et al. |
| 2014/0200924 A1* | 7/2014 | Gilbert .................. G06Q 40/08 705/3 |
| 2014/0200929 A1* | 7/2014 | Fitzgerald ............... G06F 21/88 705/4 |
| 2014/0244312 A1* | 8/2014 | Gray et al. .................. 705/4 |
| 2015/0045983 A1 | 2/2015 | Fraser et al. |
| 2015/0058045 A1* | 2/2015 | Santora .................. G08G 1/162 705/4 |
| 2015/0127570 A1 | 5/2015 | Doughty et al. |
| 2015/0170287 A1 | 6/2015 | Tirone et al. |
| 2015/0213556 A1 | 7/2015 | Haller, Jr. |
| 2017/0293894 A1 | 10/2017 | Taliwal et al. |
| 2018/0108189 A1 | 4/2018 | Park et al. |

FOREIGN PATENT DOCUMENTS

| | | |
|---|---|---|
| CA | 2658219 A1 | 1/2008 |
| DE | 102010001006 A1 | 7/2011 |
| EP | 1826734 A1 | 8/2007 |
| EP | 1965361 A2 | 9/2008 |
| EP | 2481037 A1 | 8/2012 |
| GB | 2486384 A | 6/2012 |
| GB | 2488956 A | 9/2012 |
| KR | 20020067246 A | 8/2002 |
| WO | 2002079934 A2 | 10/2002 |
| WO | 2012045128 A1 | 4/2012 |
| WO | 2012067640 A1 | 5/2012 |
| WO | 2012097441 A1 | 7/2012 |
| WO | 2012106878 A1 | 8/2012 |
| WO | 2012173655 A1 | 12/2012 |
| WO | 2012174590 A1 | 12/2012 |
| WO | 2013072867 A1 | 5/2013 |

OTHER PUBLICATIONS

"License plate readers allow police to quickly scan, check for offenders." Mar. 17, 2013. Retrieved from <http://cjonline.com/news/2013-03-17/license-plate-readers-allow-police-quickly-scan-check-offenders> on Jun. 28, 2013.

"Car insurance firms revving up mobile app features." Feb. 2, 2012. Retrieved from <http://www.insurance.com/auto-insurance/auto-insurance-basics/car-insurance-mobile-apps.html> on Jun. 28, 2013.

"Scan Someone's License Plate and Message Them Instantly with New Bump App." Sep. 17, 2010. Retrieved from <http://www.popsci.com/cars/article/2010-09/social-networking-site-uses-license-plates-connect-drivers> on Jun. 28, 2013.

"License Plate Scanner Obsoletes Meter Maid." Feb. 1, 2011. Retrieved from <http://www.thetruthaboutcars.com/2011/02/license-plate-scanner-obsoletes-meter-maid> on Jun. 28, 2013.

"Bump (application)." Retrieved from <http://en.wikipedia.org/wiki/Bump_(application)> on Aug. 29, 2013.

"Insurance Tech Trends 2013." Deloitte. 2013.

"Trends 2013—North American Insurance eBusiness and Channel Strategy." Forrester. May 16, 2013.

"Top 10 Technolgy Trends Impacting Life and PC Insurers in 2013." Gartner. Mar. 27, 2013.

"The Automated Collision Notification System." NHTSA. Retrieved from <http://www.nhtsa.gov/DOT/NHTSA/NRD/Articles/EDR/PDF/Research/Automated_Collision_Notification_System.pdf> on Nov. 12, 2013.

"ACN Field Operational Test—Final Report." NHTSA. Oct. 31, 2000.

"ACN Field Operational Test—Evaluation Report." NHTSA. Feb. 2001.

"Automatic Crash Notification." ComCARE Alliance. Retrieved from <http://www.nhtsa.gov/DOT/NHTSA/NRD/Articles/EDR/PDF/Research/ComCARE_ACN_System.pdf> on Nov. 12, 2013.

"Geico App—Android Apps on Google Play." Retreived from <https://play.google.com/store/apps/details?id=com.geico.mobile&hl=en> on Nov. 12, 2013.

(56) References Cited

OTHER PUBLICATIONS

"Near Field Communication: A Simple Exchange of Information." Samsung. Mar. 5, 2013. Retrieved from <http://www.samsung.com/us/article/near-field-communication-a-simple-exchange-of-information> on May 21, 2013.

"New Technology Security Risks : QR codes and Near Field Communication." Retrieved from <http://www.qwiktag.com/index.php/knowledge-base/150-technology-security-risks-qr-codes> on Nov. 13, 2013.

"Fraunhofer offers secure NFC keys that can be shared via QR codes." NFC World. Mar. 20, 2013. Retrieved from <http://www.nfcworld.com/2013/03/20/323184/fraunhofer-offers-secure-nfc-keys-that-can-be-shared-via-qr-codes> on Nov. 13, 2013.

Maciag, A. K. (1980). Motor accident insurance and systems of compensation. (Order No. MK49023, University of Alberta (Canada)). ProQuest Dissertations and Theses, 1. Retrieved from http://search.proquest.com/docview/303097892?accountid= 14753 (303097892).

Spevacek, C. E., Ledwith, J. F., Newman, T. R., & Lennes, John B., Jr. (2001). Additional insured and indemnification issues affecting the insurance industry, coverage counsel, and defense counsel—legal advice and practice pointers. FDCC Quarterly, 52(1), 3-101. Retrieved from http://search.proquest.com/docview/201215466?accountid=14753.

"Using Smartphones to Detect Car Accidents and Provide Situational Awareness to Emergency Responders." Mobile Wireless Middleware, Operating Systems, and Applications, pp. 29-42, Jul. 2010.

"Mercedes-Benz mbrace." Oct. 22, 2010.

"Design and Development of a GSM Based Vehicle Theft Control System and Accident Detection by Wireless Sensor Network." International Journal of Emerging Trends in Engineering and Development, Issue 2, vol. 5, pp. 529-540, Jul. 2012.

"The Potential for Automatic Crash Notification Systems to Reduce Road Fatalities." Annals of Advances in Automotive Medicine, vol. 52, pp. 85-92. 2008. (retrieved from http://www.ncbi.nlm.nih.gov/pmc/articles/PMC3256762/, Jan. 12, 2013).

"Automatic Crash Response, Car Safety & Emergency Services—OnStar" retrieved from https://www.onstar.com/web/portal/emergencyexplore?tab=1, Jan. 12, 2013.

"A study of US crash statistics from automated crash notification data." 20th International Technical Conference on the Enhanced Safety of Vehicles Conference (ESV). Lyon, France, pp. 18-21, 2007.

"This App Turns Smartphones Into Safe Driving Tools." Mashable. Aug. 30, 2012. Retrieved from http://mashable.com/2012/08/30/drivescribe-app-safe-driving, Nov. 12, 2013.

"Privacy Policy." Lemon Wallet. Retrieved from http://lemon.com/privacy,May 20, 2013.

"Design and implementation of a smart card based healthcare information system." Computer Methods and Programs in Biomedicine 81, pp. 66-78, Sep. 27, 2003.

"Information-Sharing in Out-of-Hospital Disaster Response: The Future Role of Information Technology." Abstracts of Prehospital and Disaster Medicine. Retrieved from http://journals.cambridge.org/action/displayAbstract?fromPage=online&aid=8231246, May 20, 2013.

"For insurance companies, the day of digital reckoning." Bain & Company, 2013.

"New Idea: QR Codes for License Plates." Feb. 11, 2011. Retrieved from http://www.andrewcmaxwell.com/2011/02/new-idea-qr-codes-for-license-plates, May 21, 2013.

"QR Code." IDL Services. Retrieved from http://www.internationaler-fuehrerschein.com/en/the-idd/qr-code-quick-response-code-feature-in-the-idd.html, May 21, 2013.

"Vehicle Wrap Trends: What are QR Codes and why do I need one?" The Brandtastic Branding & Marketing Education Blog. Retrieved from http://www.sunrisesigns.com/our-blog/bid/34661/Vehicle-Wrap-Trends-What-are-QR-Codes-and-why-do-l-need-one, May 21, 2013.

"Microsoft Tag Implementation Guide." Aug. 2010.

"Encrypted QR Codes." qrworld. Nov. 11, 2011. Retrieved from http://qrworld.wordpress.com/2011/11/27/encrypted-qr-codes/, Nov. 13, 2013.

Domanico, A., Geico Releases Insurance Glovebox App for Android, Aug. 10, 2010. Retrieved from [http://androidandme.com/2010/08/applications/ geico-releases-insurance-glovebox-app-for-android/]. Mar. 22, 2017—U.S. Notice of Allowance—U.S. Appl. No. 14/313,052.
Mar. 24, 2017—U.S. Non-Final Office Action—U.S. Appl. No. 14/022,552.
Apr. 11, 2017—U.S. Non-Final Office Action—U.S. Appl. No. 14/313,753.
"Mercedes-Benz mbrace: Safety & Security Services", Rev. Apr. 9, 2012, Mercedes-Benz, <https://www.mbusa.com/vcm/MB/DigitalAssets/pdfmb/mbrace_Cut_Sheet_All_4_12_12_.pdf>, 37 pages.
Freeman, Shanna, "How OnStar Works", Feb. 8, 2006, HowStuffWorks.com, <http://auto.howstuffworks.com/onstar.htm>, 12 pages.
"GenieCam", on AngelList by Selka Inc. w/GenieCam website excerpt, Dec. 11, 2012, AngelList <https://angel.co/geniecam>, 6 pages.
"ATX Launches Enhanced Automatic Collision Notification for BMW", TMC News, Jan. 11, 2009, <http://www.tmcnet.com/2009/01/11/3905139.htm>, 2 pages.
Aug. 10, 2017—U.S. Office Action—U.S. Appl. No. 14/688,611.
Sep. 7, 2017—U.S. Notice of Allowance—U.S. Appl. No. 14/313,052.
Nov. 17, 2017—U.S. Notice of Allowance—U.S. Appl. No. 14/313,753.
Jeevagan et al, RFID Based Vehicle Identification During Collisions, R.V. College of Engineering, Dept. of Instrumentation Technology, Bangalore, Karnataka, India, IEEE Global Humanitarian Technology Conference (GHTC), downloaded from Google/Scholar, Nov. 13, 2017.
Harding, S.J. (2002), The "Alva Cape" and the Automatic Identification System: The Use of VHF in Collision Avoidance at Sea, The Journal of Navigation, 55(3), pp. 431-442.
Dec. 28, 2017—U.S. Final Office Action—U.S. Appl. No. 14/688,611.
Jan. 4, 2018—U.S. Final Office Action—U.S. Appl. No. 14/022,552.
Feb. 9, 2018—U.S. Notice of Allowance—U.S. Appl. No. 14/313,052.
May 23, 2018—U.S. Notice of Allowance—U.S. Appl. No. 14/313,052.
Mar. 9, 2018—U.S. Notice of Allowance—U.S. Appl. No. 14/313,753.
Jul. 5, 2018—U.S. Non-Final Office Action—U.S. Appl. No. 15/235,213.
Aug. 27, 2018—U.S. Non-Final Office Action—U.S. Appl. No. 14/022,552.
Nov. 16, 2018—U.S. Non-Final Office Action—U.S. Appl. No. 14/688,611.
Nov. 30, 2018—U.S. Notice of Allowance—U.S. Appl. No. 15/235,213.
Mar. 18, 2019—U.S. Final Office Action—U.S. Appl. No. 14/022,552.
Apr. 26, 2019—U.S. Notice of Allowance—U.S. Appl. No. 14/688,611.
Oct. 1, 2019—U.S. Notice of Allowance—U.S. Appl. No. 14/022,552.
"Pre-contract information related to comprehensive motor vehicle insurance for vehicles registered under PIPMV-V-1/2014," Ceska Pojistovna, Jan. 2014, pp. 1-30.
"What is insurance telematics?" VEMOCO, retrieved from [http://vemoco.com/insurance] on Jun. 25, 2014, pp. 1-5.
"Telematics: How Big Data Is Transforming the Auto Insurance Industry," SAS White Paper, copyright 2013, pp. 1-12.
"Insurance telematics: What is it? and why we should care," Verisk Analytics, Hakim et al., 2013, retrieved from [http://www.verisk.com/visualize/insurance-telematics-what-is-it-and-why-we-should-care_html] on Jun. 25, 2014, pp. 1-4.
"Telematics data sharing, competition law and privacy rights," Out-Law, Jan. 8, 2014, retrieved from [http://www.out-law.com/articles/2014/january/telematics-data-sharing-competition-law-and-privacy-rights/] on Jun. 25, 2014, pp. 1-5.
"BoxyMo.ie—Rewarding Better Driving," Black Box Car Insurance, retrieved from [http://www.boxymo.ie/telematics.aspx] on Jun. 25, 2014, pp. 1-3.
"Using Mobile Solutions to Improve Insurance," Frost & Sullivan, copyright 2011, pp. 1-16.
"Telematics FAQs | Girls Drive Better," Girls Drive Better, retrieved from [http://www.girlsdrivebetter.com/telematics-faqs/#,U6qqBpSSxDR] on Jun. 25, 2014, pp. 1-6.

(56) References Cited

OTHER PUBLICATIONS

"Telematics (also known as black box) insurance," Drive Smart Insurance, retrieved from [http://drivesmartinsurance.co.uk/telematics/] on Jun. 25, 2014, pp. 1-2.
NPL Search History, "EIC 3600 Search Report," Scientific & Technical Information Center, Access Search Log No. 605818, Nov. 8, 2019, pp. 1-8.
"Car Total Loss Evaluation and Negotiation," Quiroga Law Office, PLLC, retrieved Mar. 10, 2017 from http://www.auto-insurance-claim-advice.com/car-total-loss-2.html, 3 pages.
"Understanding Total Loss Claims," the Travelers Indemnity Company, retrieved Mar. 10, 2017 from https://www.travelers.com/claims/total-loss-claims.aspx, 1 page.
Aug. 7, 2020—U.S. Final Office Action—U.S. Appl. No. 16/108,147.
Oct. 15, 2020—U.S. Notice of Allowance—U.S. Appl. No. 15/493,685.
Nov. 13, 2020—U.S. Non-Final Office Action—U.S. Appl. No. 16/292,687.

\* cited by examiner

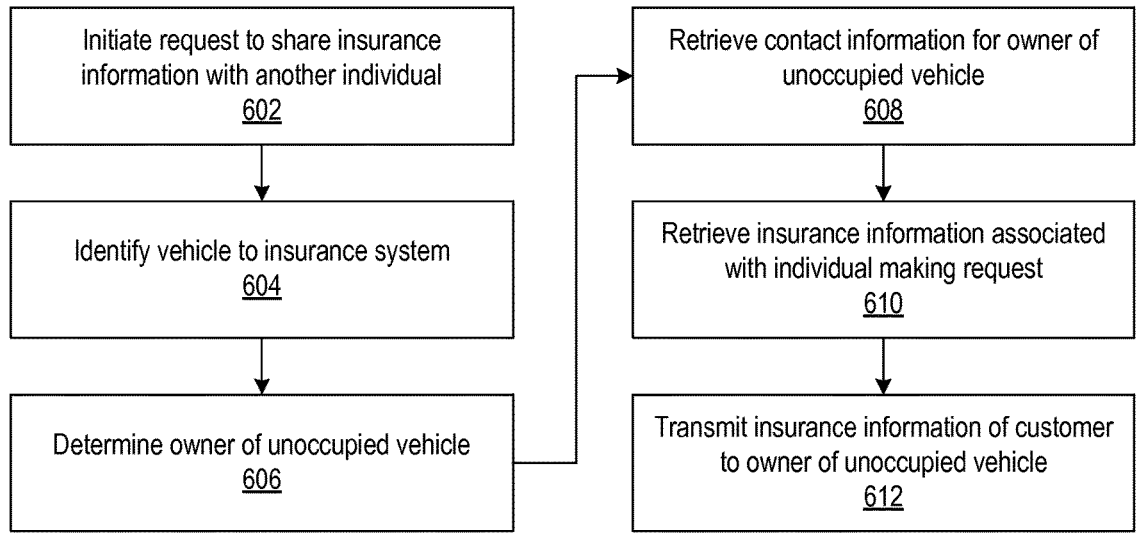
FIG. 6
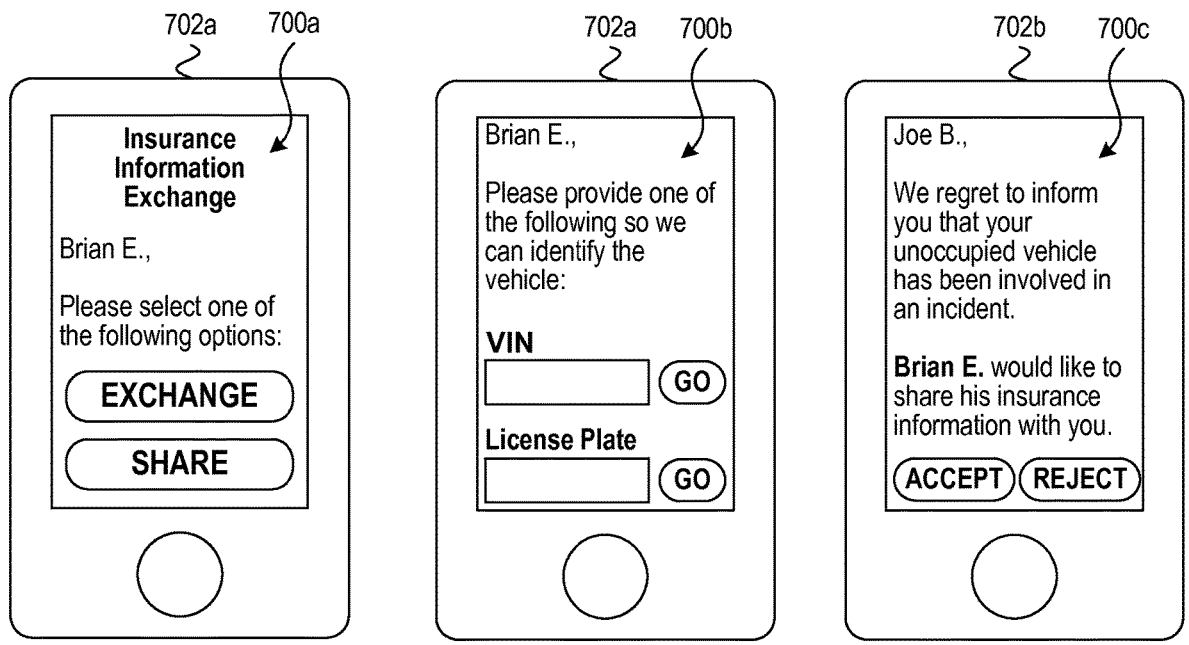
FIG. 7A
FIG. 7B
FIG. 7C

ELECTRONIC EXCHANGE OF INSURANCE INFORMATION

TECHNICAL FIELD

The present invention generally relates to providing insurance-related services and particularly relates to facilitating and responding to an electronic exchange of insurance information between electronic computing devices.

BACKGROUND

Drivers often keep respective hardcopies of their insurance information in their vehicles in case a vehicle incident such as a vehicle collision occurs. Following a vehicle incident, a driver may exchange insurance and contact information with another driver. Typically, drivers involved in a vehicle incident may use paper and pen to exchange insurance information. This paper and pen approach is also often employed to leave behind insurance information when a driver damages an unoccupied vehicle or other unattended property. In some circumstances, drivers may attempt to exchange insurance information by taking photos of the respective insurance cards.

Papers containing insurance information, however, are easily lost and damaged. Additionally, paper and pen may not be available or readily accessible in some situations. Moreover, depending on the severity of the vehicle incident, a driver may be rattled to the point that copying insurance information via paper and pen or taking a photograph of an insurance card is prohibitively difficult. Therefore, a need exists for improved approaches to sharing and exchanging insurance information between individuals.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A first aspect described herein provides a computer-implemented method of providing insurance information. An insurance application is provided to a mobile computing device, and the insurance application is configured to transmit insurance information to another mobile computing device. Transmission of insurance information from the mobile computing device to the other mobile computing device may be initiated using the insurance application. A message may be generated that indicates the insurance information was transmitted from the mobile computing device to the other mobile computing device. The message may be sent to an insurance system, and receipt of the message at the insurance system may cause the insurance system to respond to the transmission of insurance information from the mobile device to the other mobile device. The transmission of insurance information may be initiated in response to a bump gesture performed between the mobile device and the other mobile device.

A second aspect described herein provides non-transitory computer-readable medium having computer-executable instructions stored thereon that carry out one or more of the steps described above. As used in this disclosure non-transitory computer-readable media include all types of computer-readable media with the sole exception of a transitory propagating signal.

A third aspect described herein provides a system for exchanging insurance information between individuals. The system may include one or more processors and a data store that stores insurance information and vehicle telematics information. A telematics analyzer may, in operation, analyze the vehicle telematics information to determine whether a vehicle incident has occurred. In response to a determination that a vehicle incident has occurred, the vehicle telematics analyzer may identify the individuals involved in the vehicle incident based on at least a portion of the vehicle telematics data. An insurance information exchange handler may retrieve from the data store insurance information respectively associated with the individuals involved in the vehicle incident. The insurance information exchange handler may initiate transmission of insurance information for a first individual to a mobile computing device associated with a second individual. The insurance information exchange handler may also initiate transmission of insurance information for the second individual to a mobile computing device associated with the first individual.

The details of these and other embodiments of the disclosure are set forth in the accompanying drawings and description below. Other features and advantages of aspects of the disclosure will be apparent from the description and drawings.

DESCRIPTION OF DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated that one or more components illustrated in the accompanying figures may be positioned in other than the disclosed arrangement and that one or more of the components illustrated may be optional.

FIG. 6 is a flowchart of example method steps for sharing insurance information to an individual.

FIGS. 7A-C are example insurance application screenshots that may be presented when sharing insurance information.

DETAILED DESCRIPTION

Figure 1A:
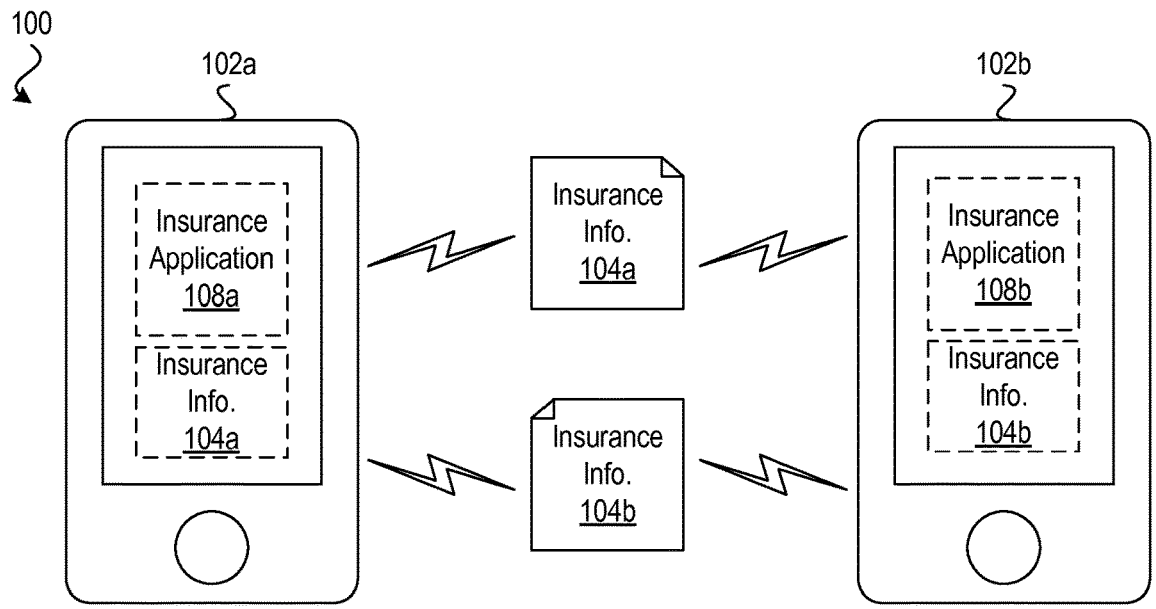
FIG. 1A is an example of an implementation of a system for an electronic exchange of insurance information.

Aspects of the present disclosure are directed towards various approaches to facilitating and responding to an electronic exchange of insurance information. Individuals may wirelessly exchange insurance information via insurance applications installed at their respective mobile electronic computing devices ("mobile devices"). The wireless exchange of information advantageously improves the process of sharing insurance information with another individual and receiving insurance information from that individual. In particular, wirelessly exchanging insurance information via mobile device can be advantageous where writing instruments or writing materials are unavailable or inaccessible. Accordingly, the approaches described below provide a quick and efficient way to exchange insurance information between individuals.

Additionally, the insurance application at a mobile device may notify an insurance system located remotely relative to the mobile device that an individual shared insurance information with another individual. Individuals may share insurance information for a variety of reasons. For example, individuals may exchange insurance information following a vehicle incident such as a vehicle collision. Upon notification that an individual shared insurance information, the insurance system may initiate various workflows in response. The insurance system may automatically follow-up with the individual to verify whether a vehicle incident occurred and whether medical, police, or other types of assistance is needed. The insurance system may also automatically initiate a placeholder insurance claim in the event that a vehicle incident did occur and the individual wishes to file an insurance claim. Upon confirmation that a vehicle incident occurred and the individual wishes to file an insurance claim, the insurance system may elevate the placeholder insurance claim to a confirmed insurance claim and continue the claims processing procedure. In this way, the insurance system may advantageously automate at least a portion of the claims processing procedure.

Furthermore, the insurance system may be in communication with a vehicle telematics unit installed in the vehicle of the individual. The vehicle telematics unit may transmit vehicle telematics data to the insurance system, and the insurance system may detect when the vehicle is involved in a vehicle incident through an analysis of the vehicle telematics data. The insurance system may also identify other vehicles and individuals involved in the vehicle incident by analyzing the vehicle telematics data. In response to detection of a vehicle incident, the insurance system may likewise initiate various workflows. Again the insurance system may follow-up with the individuals determined to be involved in the incident and create a placeholder insurance claim for the incident. The insurance system may also facilitate the electronic exchange of insurance information between the individuals involved in the vehicle incident as described in further detail below. Moreover, the insurance system may facilitate sharing insurance information from an individual involved in a vehicle incident with an unoccupied vehicle (e.g., a parked vehicle) to the owner of the unoccupied vehicle. As described in further detail below, the insurance system may also facilitate settlement payments between individuals involved in vehicle incidents. These and other aspects will be appreciated with the benefit of the disclosure described in further detail below.

Referring to FIG. 1A, an example of an implementation of a system 100 for electronically exchanging insurance information is shown. As seen in FIG. 1, mobile devices 102a-b are configured to wirelessly exchange insurance information 104a-b with each other. In this example, the insurance information 104a is stored at the mobile device 102a, and the insurance information 104b is stored at the mobile device 102b. An insurance application 108a is also installed at the mobile device 102a, and an insurance application 108b is installed at the mobile device 102b. The insurance applications 108a-b may be configured to facilitate the wireless exchange of the insurance information 104a-b between the mobile devices 102a-b. The insurance applications may reside in a data store of the mobile device and be configured for operation on the mobile device. The mobile devices 102a-b may be, e.g., a mobile telephone, a personal digital assistant (PDA), a palmtop computer, a tablet computer, and other types of mobile computing devices configurable to exchange direct communications or communications via a communication network.

Various approaches may be selectively employed to wirelessly exchange the insurance information 104a-b between the mobile devices 102a-b. In one example implementation, individuals may initiate the exchange of insurance information through a "bump" gesture in which the individuals physically bump the mobile devices 102a-b together. The insurance applications 108a-b in this example approach may be configured to detect and respond to the bump gesture. In response to detection of the bump gesture, the insurance applications 108a-b may wirelessly transmit the respective insurance information 104a-b and listen for wireless transmission of the insurance information from the other mobile device. It will be appreciated that a bump gesture is but one approach that may be selectively employed to initiate an exchange of insurance information between individuals. Other approaches may be selectively employed. A mobile device may store the insurance information received from another mobile device in a data store (not shown) at the mobile device. In FIG. 1, for example, the mobile device 102a may store the insurance information 104b received from the mobile device 102b, and the mobile device 102b may store the insurance information 104a received from the mobile device 102a. Those skilled in the art will appreciate that the technical implementation of the insurance application configured to detect and respond to a bump gesture may be similar to the technical implementation of various commercially available mobile applications that are also configured to exchange insurance information.

Insurance information may include information related to the individual, a vehicle associated with the individual, and an insurance policy associated with the individual. Information related to the individual may include, e.g., the name of the individual and contact information for the individual such as a mailing address, email address, and phone number. Information related to a vehicle associated with the individual may include, e.g., the make and model of the vehicle, the year of the vehicle, the color of the vehicle, a vehicle identification number (VIN), and a license plate number.

Information related to an insurance policy associated with the individual may include, e.g., the name of the insurance provider, the insurance policy number, the insurance policy type, and the insurance policy effective dates. The mobile devices 102a-b may store the insurance information in various ways such as, e.g., as plain text, as an image, or as a digital pass similar to the digital passes used by Apple Passbook or Google Wallet.

Individuals may initiate the exchange process by launching the insurance applications 108a-b at the respective mobile devices 102a-b. Once the applications 108a-b are launched and running at the mobile devices 102a-b, the individuals may provide input at a respective user interface presented by the insurance applications, the input indicating a request to share insurance information with the other mobile device. For example, the individuals may provide the input by selecting a button of the user interface. In response to receipt of the input, the insurance applications may retrieve the respective insurance information 104a-b from the respective data stores and initiate the transmission of the insurance information to the other mobile device. Also in response to receipt of the input, the insurance applications may listen for transmission of the insurance information 104a-b from the other mobile device. Upon receipt of the insurance information 104a-b, the insurance applications 108a-b may store the received insurance information at the data store and present the received insurance information at the user interface. The insurance applications 108a-b may also be configured to retrieve and display any received insurance information in response to receipt of input, e.g., at a list of received insurance information.

Additional or alternative approaches to wirelessly exchanging the insurance information 104a-b may be selectively employed. The particular approach employed may depend on the platform on which the insurance application operates including the operating system of the mobile device and the hardware available at the mobile device. Additional or alternative approaches may exchange the insurance information 104a-b using, for example, Bluetooth®, WiFi Direct, AirDrop®, iBeacon, via near field communication (NFC) techniques, and other standards or services suitable for the exchange of wireless information between electronic computing devices in relatively close proximity to each other.

Figure 1B:
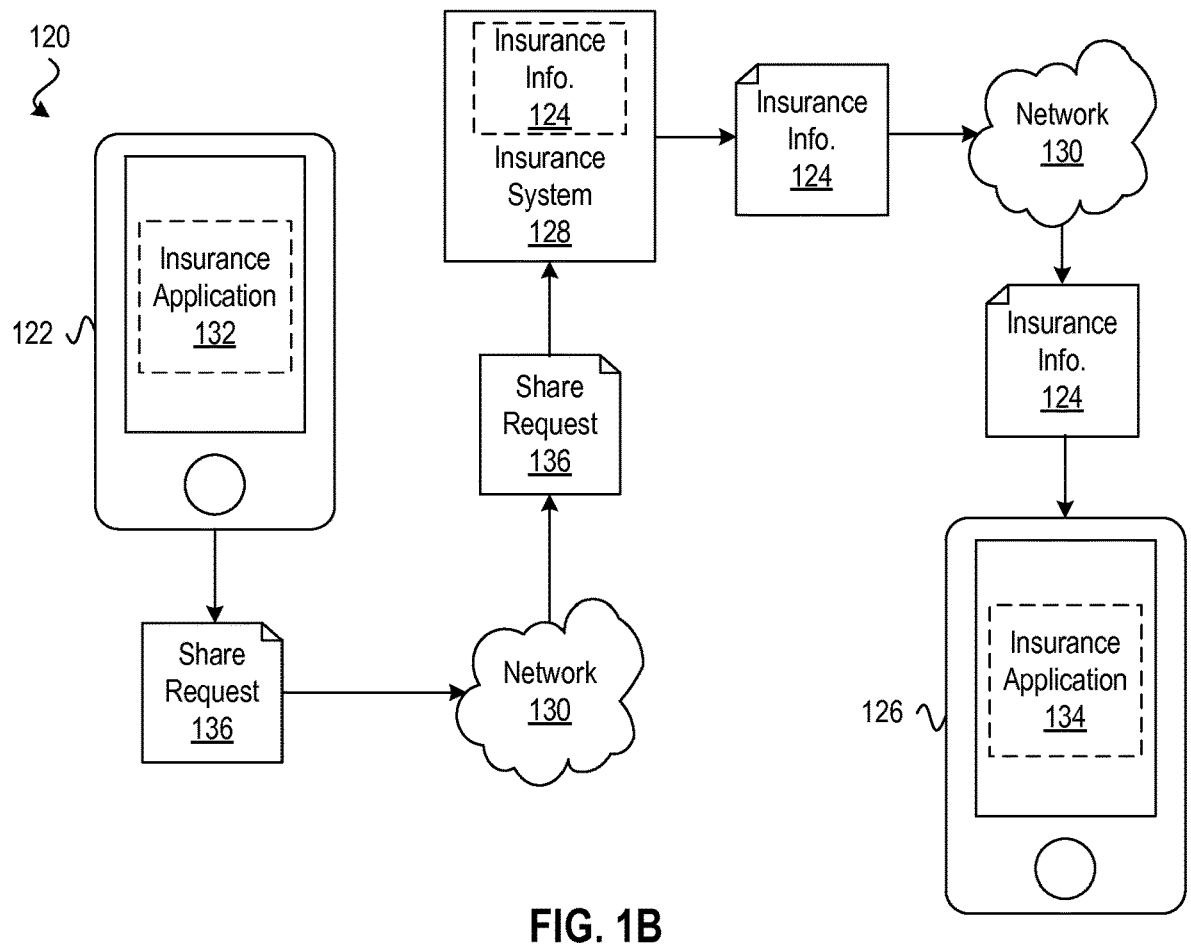
FIG. 1B is another example of an implementation of a system for an electronic exchange of insurance information.

Referring now to FIG. 1B, another example of a system 120 for electronically exchanging insurance information is shown. In this example system 120, a mobile device 122 shares insurance information 124 with another mobile device 126 via an insurance system 128. As seen in FIG. 1B, the insurance system 128 in this example is located remotely relative to the mobile devices 122 and 126 and is in signal communication with the mobile devices via a network 130. The network may be a wireless network (e.g., a cellular network), a wired network (e.g., the Internet), or a combination of one or more wireless and wired networks.

As also seen in FIG. 1B, the insurance system 128 stores the insurance information 124 rather than the mobile devices 122 or 126. Each mobile device 122 and 126, however, similarly includes an insurance application 132 or 134. The insurance system 128 may be provided and maintained by an insurance company, and the insurance system may store insurance information associated with the insurance customers of the insurance company. Each insurance customer may be associated with a unique identifier, e.g., a customer number, a phone number, an email address, or other types of information that uniquely identifies the insurance customer. The insurance information for an insurance customer may be associated with the insurance customer through this unique identifier. The insurance system 128 may engage in an authentication procedure (e.g., through login credentials) with the insurance applications 132 and 134 in order to associate a respective insurance application with a particular insurance customer. Conventional approaches known to those skilled in the art may be employed to authenticate the insurance applications 132 and 134 with the insurance system and associate the insurance applications with a particular insurance customer.

In the example system 120 of FIG. 1B, an insurance customer may submit a request to the insurance system 128 requesting that the insurance system share the insurance information associated with the insurance customer to another individual. In response to receipt of the request, the insurance system 128 may retrieve the insurance information 124 associated with the insurance customer and transmit the insurance information to the individual identified in the request. As shown by way of example in FIG. 1B, an individual may provide input to the insurance application 132 (e.g., via a user interface) to initiate the request. As used in this disclosure, a request to share insurance information with another individual may be referred to as a share request 136. Additionally, an individual submitting a share request may be referred to as the sender of the insurance information, and the individual receiving the insurance information may be referred to as the recipient. It will be appreciated that two individuals may each be both a sender and a recipient when the two individuals exchange their respective insurance information. Moreover, sharing insurance information, as used in this description, refers to a transmission of insurance information from a first electronic computing device to a second electronic computing device. Exchanging insurance information, as used in this description, refers to a first transmission of first insurance information from a first computing device to a second computing device and a second transmission of second insurance information from the second computing device to the first computing device. It will be appreciated that the first and second electronic computing device may be mobile devices like the mobile devices 102a-b described above. It will also be appreciated that insurance information may be exchanged in a client-server fashion wherein the first computing device may be a server of an insurance system such as the insurance system 128 described above and the second computing device may be a mobile device such as the mobile devices 102a or 102b described above.

The insurance application 132, in this example, may transmit the share request from the mobile device 122 and through the network 130 to the insurance system 128. The insurance application 132 may configure the share request 136 to include information identifying the sender and the recipient of the insurance information. The share request 136 may identify the sender and the recipient via unique identifiers respectively associated with the sender and the recipient of the insurance information 124. Identifying information for a sender and a recipient may include, e.g., a customer number, a telephone number, or an email address. In some circumstances, a sender may not know the identity of the recipient. In these circumstances, the sender may only have information relating to the vehicle associated with the recipient. Accordingly, identifying information for a recipient may also include the VIN or license plate number of the vehicle associated with the recipient. As discussed in further detail below, the insurance system 128 may be configured to determine the identity of the recipient based on the VIN or license plate number and retrieve contact information for the recipient in order to provide the insurance information associated with the sender.

In response to receipt of the share request 136, the insurance system 128 may retrieve the insurance information 124 for the sender indicated in the share request. The insurance system 128 may then transmit the insurance information 124 to the recipient indicated in the share request via the network 130. As shown by way of example in FIG. 1B, the recipient may receive the insurance information at a mobile device 126. The insurance application 134 at the mobile device 126 may receive the insurance information 124, store the insurance information at a date store of the mobile device, and present the insurance information at a user interface of the insurance application. In some example implementations, the insurance application 132 may initiate the share request 136 in response to a bump gesture between the mobile devices 122 and 126 as described above. In other example implementations, the insurance application 132 may initiate the share request 136 in response to receipt of input from the sender at a user interface provided by the insurance application. It will also be appreciated that the insurance system 128 may employ various approaches to deliver the insurance information 124 to the recipient. As one example, the insurance system 128 may deliver the insurance information in an email addressed to the recipient using an email address associated with the recipient. The email may thus be delivered to an email server and retrieved by the recipient from any computing device in signal communication with the email server including, e.g., a mobile telephone, a desktop computer, a laptop computer, and other types of computing devices. The insurance system 128 may also deliver the insurance information 124 to the mobile device 126 in a Short Message Service (SMS) message.

It will be appreciated with the benefit of this disclosure that the approaches set forth above advantageously improves the process of sharing or exchanging insurance information. The example approach of exchanging insurance information via a bump gesture is quick and efficient when both the sender and the recipient are present, e.g., at the scene of a vehicle incident. The approaches set forth above also enable an individual to share insurance information with the recipient when the recipient is not present, e.g., after the individuals have left the scene of a vehicle incident or when a vehicle involved in a vehicle incident is unoccupied. Additional advantages will be further appreciated with the benefit of the additional disclosures provided below.

Figure 2:
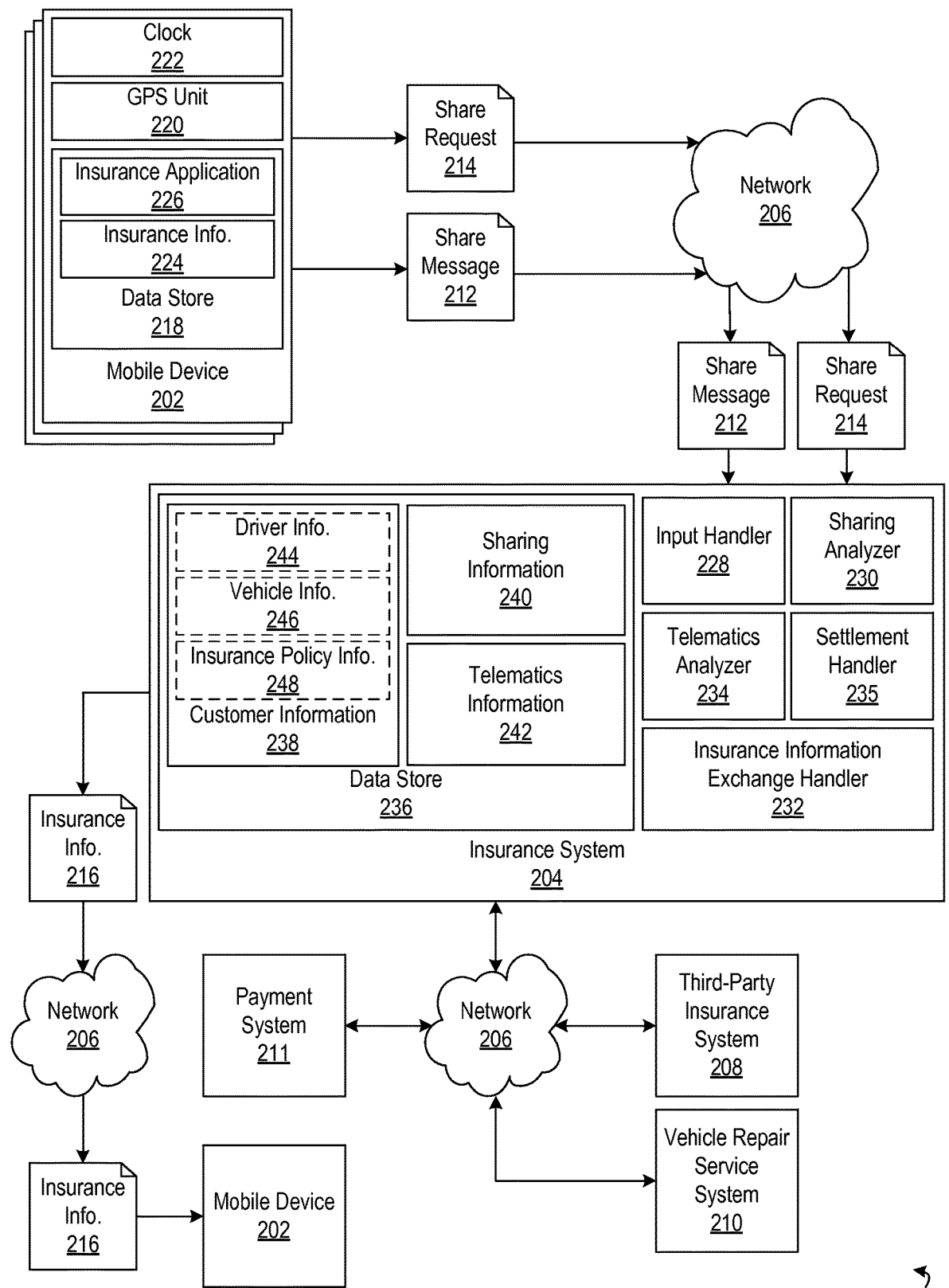
FIG. 2 is a block diagram of an example of an implementation of a system for facilitating and responding to the sharing and exchange of insurance information.

Referring now to FIG. 2, a block diagram of an example of an implementation of a system 200 for facilitating and responding to the sharing and exchange of insurance information is shown. As seen in FIG. 2, multiple mobile devices 202 may be in signal communication with an insurance system 204 via a network 206. The network 206 may be a wired and/or a wireless network such as, e.g., a cellular network and/or the Internet. The insurance system 204 may also be in signal communication with a third-party insurance system 208, a vehicle repair service system 210 of a vehicle repair service, and a payment system of a payment service. As described above with reference to FIGS. 1A-B, a mobile device 202 may transmit to the insurance system 204 a share message 212 in response to sharing or exchanging insurance information with another mobile device. As also described above, a mobile device 202 may also transmit to the insurance system 204 a share request 214. In response to receipt of the share request 214, the insurance system 204 may transmit insurance information 216 associated with a sender indicated in the share request to another mobile device associated with a recipient indicated in the insurance request. Share messages 212 and share requests 214 may be implemented according to any communication standard suitable for transmitting via the network 206. Accordingly, a share message 212 or a share request 214 may be, e.g., an HTTP request. Other technical standards may be selectively employed for the format of the share messages 212 or share requests 214. If the insurance system 204 receives a share message 212 or a share request 214, the insurance system 204 may conclude that an individual associated with a share message or share request has potentially been involved in a vehicle incident and take various steps in response. Responses to receipt of a share message 212 or share requests 214 will be discussed in further detail below.

The mobile device 202 may be, e.g., a mobile telephone as described above and include, among other components: a data store 218; a location determination unit such as a Global Positioning System (GPS) unit 220; and a timing unit such as a clock 222. The data store 218 may store, among other things: insurance information 224 associated with an insurance customer that operates the mobile device; and an insurance application 226 configured to share and exchange insurance information as described above. The insurance application 226 may be in signal communication with the GPS unit 220 and the clock 222. Accordingly, the insurance application 226 may receive location information from the GPS unit 220 (e.g., latitude and longitude coordinates), and the insurance application may receive date and time information from the clock 222.

The insurance application 226 may configure share requests 214 and share messages 212 with the location information, date information, and time information. As a result, the insurance system 204 may determine the location, date, and time an insurance customer shared or exchanged insurance information. As described in further detail below, the insurance system 204 may analyze share messages 212 and share requests 214 to identify matching (or at least similar) share messages and share requests. If the insurance system 204 locates matching or similar share messages 212 or share requests 214, then the insurance may conclude that the individuals associated with those share messages or share requests were potentially involved in the same vehicle incident and likewise take various steps in response.

The insurance system 204 includes various components that facilitate the sharing and exchange of insurance information between insurance customers. The insurance system 204, in this example, also includes various components for responding to the sharing or exchange of insurance information. In addition, the insurance system 204 shown by way of example in FIG. 2 includes components for determining whether a vehicle has been involved in a vehicle incident based on telematics information received from a telematics device installed in the vehicle. The components of the insurance system 204, in this example, include: an input handler 228 that, in operation, receives and handles received share messages 212 and share requests 214; a sharing analyzer 230 that, in operation, analyzes received share message and share requests; an insurance information exchange handler 232 that, in operation, manages the distribution of insurance information between electronic computing devices; a telematics analyzer 234 that, in operation, analyzes telematics information to determine when a vehicle has been involved in a vehicle incident; a settlement handler that, in operation, facilitates settlements between individuals involved in a vehicle incident; and a data store 236. The various components of the insurance system may reside at a single computing device or be located on multiple interconnected computing devices in a distributed fashion.

The data store 236 may store information 238 relating to insurance customers, information 240 relating to the sharing or exchange of insurance information, and information 242 relating to the telematics data received from the vehicles respectively associated with the insurance customers. The data store 236 may implement a data model that relates insurance customers, sharing information, and telematics information. The data store 236 may thus store the customer information 238, sharing information 240, and telematics information 242 in one or more corresponding database tables as related database records. The data store 236 may also include a database management system (DBMS) that facilitates the storage and retrieval of information at the data store. Any data store and DBMS suitable for providing insurance-related services may be selectively employed. Furthermore, the data store 236 may include multiple interconnected data stores with the customer information 238, sharing information 240, and telematics information 242 stored in a distributed fashion across the interconnected data stores.

Insurance customer information 238 may include, e.g., information 244 relating to one or more drivers, information 246 relating to one or more vehicles associated with a driver, and information 248 relating to an insurance policy associated with a driver. Driver information 244 may include biographic information (e.g., name, age), contact information (e.g., mailing address, phone number, email address), and other types of information associated with an individual. Vehicle information 246 may include, e.g., the make, model, year, color, VIN, license plate, repair history, and other types of information associated with a vehicle of an insurance customer. Insurance policy information 248 may include, e.g., the name of the insurance company, type of insurance policy, effective dates, coverage amounts, deductibles, and other types of information associated with an insurance customer.

Sharing information 240 may include records ("sharing records") of share messages 212 and share requests 214 received at the insurance system 204. A sharing record may correspond to a share message 212 or a share request 214. Accordingly, a sharing record that corresponds to a share message 212 or share request 214 may include information describing a sharing or exchange of insurance information 216 between insurance customers including, e.g.: a unique identifier associated with sender; a unique identifier associated with the recipient; a geographic location from which the sender shared or exchanged the insurance information (e.g., latitude and longitude coordinates); a date the sender shared or exchanged the insurance information; and a time the sender shared or exchanged the insurance information.

Telematics information may likewise include records ("telematics records) of vehicle telematics data received from telematics units installed at the vehicles respectively associated with the insurance customers. Vehicle telematics data refers to technical information relating to the status or operation of a vehicle. Vehicle telematics data may include, for example, directional acceleration and deceleration (e.g., forward/backward, left/right, up/down), change in directional acceleration, vehicle speed or velocity, engine throttle and RPM (revolutions per minute), steering input, engagement of various vehicle subsystems (e.g., stability control systems, antilock brake systems), and the like. Those skilled in the art will appreciate that a vehicle telematics unit may be configured to collect and record data relating to the operation and status of the vehicle. The vehicle telematics unit may then provide the vehicle telematics data the insurance system 204 for storage and analysis.

The input handler 228, in operation, may handle share messages 212 and share requests 214 received at the insurance system. Accordingly, the input handler 228 may serve as the gateway, entry point, or access point to the insurance system 204 from computing devices located remotely relative to the insurance system. Upon receipt of a share message 212 or a share request 214, the input handler may take various actions in response. In some example implementations, the input handler may extract the information contained in the share message 212 or share request 214 and store the extracted information as new sharing information 240 at the data store 236. Accordingly, the input handler 228 may request creation of a new sharing record at the data store 236 containing the sharing information extracted from the share message 212 or share request 214 received. The input handler 228 may determine whether the communication received is a share message 212 or a share request 214. If the input handler 228 determines that a share message 212 has been received, then the input handler may notify the sharing analyzer 230, which may determine if any matching or similar share messages have also been received. If the input handler 228 determines that a share request 214 has been received, then the input handler may notify the insurance information exchange handler 232, which may initiate transmission of insurance information 216 to the recipient identified in the share request. In some implementations, the input handler 228 may notify the sharing analyzer 230 and insurance information exchange handler 232 by forwarding the received share messages 212 or share requests 214 to each respective component. In other implementations, the input handler 228 may notify the sharing analyzer 230 and insurance information exchange handler 232 by providing information identifying the respective sharing records created for the share messages 212 or share requests 214 received.

The insurance information exchange handler 232, in operation, manages the sharing of insurance information from a sender to a recipient and manages the exchange of insurance information between multiple individuals. The insurance information exchange handler 232 may distribute information to a recipient in response to receipt of a share request 214 identifying the recipient. The insurance information exchange handler 232 may also facilitate the exchange of insurance information between multiple individuals, e.g., following a vehicle incident.

Upon receiving a share request 214 at the insurance system 204, the input handler 228 may notify the insurance information exchange handler of the new share request 214. The insurance information exchange handler 232 may obtain information identifying the sender of the share request 214 and information identifying the recipient of the share request, e.g., by extracting the information from the share request or by querying the data store 236 for the sharing information 240 corresponding to the share request. The insurance information 216 transmitted to a recipient may include at least a portion of the customer information 238 associated with the sender of the share request 214. For example, the insurance information 216 transmitted to a recipient may at least include the contact information of the driver information 244 as well as the name of the insurance provider and insurance policy number of the insurance policy information 248. The insurance information exchange handler 232 may likewise query the data store 236 for the customer information 238 to include in the insurance information 216 to transmit to the recipient. As described above, the insurance information exchange handler 232 may thus initiate the transmission of the insurance information 216 to an electronic computing device associated with the recipient, e.g., a mobile device 202.

The insurance information exchange handler 232 may also facilitate the exchange of information between multiple individuals involved in a vehicle incident such as a vehicle collision. Through an analysis of the telematics information 242, the telematics analyzer 234 may determine that a vehicle has potentially been involved in a vehicle incident. As described in further detail below, the telematics analyzer 234 may identify multiple vehicles involved in the vehicle incident. Having identified the vehicle involved in the vehicle incident, the insurance system 204 may identify the insurance customers associated with those vehicles and the contact information (e.g., phone number, email address) for the insurance customers. The insurance system 204 may identify the contact information for the insurance customers based on the vehicle information 246 and driver information 244 stored at the data store 236 of the insurance system. Upon identifying the individuals involved in the vehicle incident, the insurance information exchange handler 232 may contact those individuals.

The insurance system 204 may also utilize the vehicle telematics information in other ways. As an example, the insurance system 204 may be in communication with one or more systems (not shown) of emergency response services, e.g., fire, police, and medical. If the insurance system 204 determines that a vehicle incident has occurred, then the insurance system may share the vehicle telematics information with the systems of the emergency response services. In turn, the emergency response services may be dispatched if needed. The vehicle telematics information may also be useful to identify vehicle incidents that go unreported to an insurance company. For relatively minor vehicle incidents, participants may choose to settle out-of-pocket rather than file an insurance claim. In these situations, an insurance company may remain unaware that the vehicle incident occurred. Using the vehicle telematics information, however, an insurance company may identify even relatively minor vehicle incidents and, in turn, conduct risk assessments of the driver, the road, and so forth, which may be useful for calculating insurance rates of usage-based insurance.

In some example implementations, the insurance information exchange handler 232 may push communications to the insurance applications 226 operating at the mobile devices 202 of the individuals determined to have been involved in the vehicle incident. In response to receipt of communications from the insurance system 204 at the insurance application 226, the insurance application may present the communications to the individual via the user interface. The communications pushed to the insurance application 226 may include requests to confirm an incident did occur and requests for permission to share the insurance information of the individual with other individuals involved in the vehicle incident. Communications pushed to the insurance application 226 may also include communications related to other insurance services, vehicle rental services, vehicle repair services, and so forth.

The insurance information exchange handler 232 may also be configured to identify an owner of a vehicle based on information received in a share request 214. As noted above, an individual may submit a share request 214 in order to share insurance information 216 with the owner of an unoccupied vehicle. The share message 214 may include a unique vehicle identifier associated with the unoccupied vehicle, e.g., a VIN or license plate number. The insurance information exchange handler 232 may thus perform a lookup at the data store 236 for vehicle information 246 corresponding to the unique vehicle identifier. The data store 235 may maintain an association between the vehicle information and driver information 244 of the owner of the vehicle. The driver information 244 may include contact information for the owner of the vehicle as described above, and the insurance information exchange handler 232 may use this contact information to push the insurance information 216 to the mobile device of the owner. In this way, the insurance system 204 facilitates sharing insurance information with the owner of an unoccupied vehicle, e.g., when an individual damages the unoccupied vehicle while driving, with a shopping cart, or in other ways.

Due to the private nature of the insurance information, the insurance system 204 may request permission from an individual to share the insurance information of that individual with other individuals. The communications pushed to the insurance applications 226 may also refer to individuals semi-anonymously (e.g., by their first name and first initial of their last name) until an individual gives permission to share insurance information. Upon receiving permission from an individual to share insurance information, the insurance information exchange handler 232 may distribute the insurance information as described above to the other individuals determined to be involved in the vehicle incident.

The sharing analyzer 230, in operation, analyzes share messages 212 or share requests 214 received at the insurance system 204 in order to identify matching or similar share messages or share requests. As described above, a share message 212 or share request 214 may include the date, time, and location that the insurance application 226 submitted the share message or share request. Accordingly, a share message 212 may match another share message where the date, time, and location information in the share messages match. A share message 212 may be similar to another share message where the date, time, and location of a share message are similar to the date, time, and location of another share message. For example, a share message 212 may be similar to another share message where each share message was submitted on the same date, within a predetermined time period of each other (e.g., 0-15 minutes), and within a predetermined distance from each other (e.g., 0-100 feet). A share request 214 may be similar to another share request in the same fashion.

Upon receipt of a share message 212 or share request 214, the input handler 228 may notify the sharing analyzer 230 of the new share message or share request received. The sharing analyzer may query the data store 236 for sharing information 240 that matches (or is similar to) the date, time, and location indicated in the received share message 212 or share request 214. As noted above, the sharing information 240 corresponds to previously received share message 212 or share requests 214. If the sharing analyzer 230 successfully locates sharing information 240 that matches (or is similar to) the information in the received share message 212 or share request 214, then the sharing analyzer may conclude that the individuals respectively associated with the share messages or share requests may each have potentially been involved in the same vehicle incident. The sharing analyzer 230 may then notify the insurance information exchange handler 232, which may initiate the process of confirming with the individuals that the vehicle incident occurred and facilitating the exchange of insurance information between the individuals as described above. It will be appreciated that the sharing analyzer 230 may employ the approach described above to identify two or more individuals involved in a vehicle incident. Moreover, the sharing analyzer 230 may determine each pairing of individuals to exchange insurance information. As an example, if the sharing analyzer 230 determines that a first individual and a second individual exchanged insurance information and that the second individual and a third individual exchanged insurance information, then the sharing analyzer may automatically determine that the first individual and the third individual should also exchange insurance information.

Upon determining that multiple individuals were potentially involved in a vehicle incident, the sharing analyzer may initiate automatic creation of a placeholder insurance claim. The individuals identified as being potentially involved in the vehicle incident may be automatically associated with the placeholder insurance claims, and the placeholder insurance claim may be automatically populated with basic information relating to the insurance customer, e.g., driver information 244, vehicle information 246, and insurance policy information 248. Upon confirmation that the incident occurred and at least one of the individuals wishes to file an insurance claim, the placeholder insurance claim may be elevated to a normal insurance claim for claims processing. The automatically generated insurance claim may be provided to an insurance agent to continue the rest of the claims processing procedure. If the individuals indicate that a vehicle incident did not occur or that they do not wish to file an insurance claim, then the placeholder insurance claim may be discarded. The telematics analyzer may similarly create a placeholder insurance claim as described above in response to an analysis of vehicle telematics data indicating that a potential vehicle incident has occurred. In view of this approach, it will be appreciated that at least a portion of the claims processing procedure may be automated, which advantageously allows insurance agents more time to focus on the details of the vehicle incident.

As noted above, the insurance system 204 may determine that an individual was potentially involved in a vehicle incident through an analysis of telematics data received at the insurance system from a telematics unit installed in the vehicle of the individual. The insurance system 204, in this example, includes a telematics analyzer 234, in operation, analyzes the telematics information 242 stored at the data store 236 in order to determine whether a vehicle associated with the individual has been involved in a vehicle incident such as a vehicle collision. The telematics analyzer 234 may also be utilized to identify other involved in a vehicle incident based on the telematics information 242.

Information describing the collection, processing, and analysis of telematics information is described in U.S. patent application Ser. No. 13/791,338 filed on Mar. 8, 2013 and entitled "Automated Accident Detection, Fault Attribution, and Claims Processing" as well as U.S. patent application Ser. No. 13/791,287 filed on Mar. 8, 2013 and entitled "Encouraging Safe Driving Using a Remote Vehicle Starter and Personalized Insurance Rates" each of which are assigned to Allstate Insurance Company of Northbrook, Ill. and each of which are incorporated by reference in this disclosure in their entirety.

The telematics information 242 may include vehicle telematics data corresponding to the operation of the vehicles of insurance customers. The telematics analyzer 234 may analyze the telematics information 242 to identify telematics events that may be indicative of an incident involving the vehicle (e.g., a vehicle collision). Examples of telematics events that may correlate with vehicle incidents include a hard-braking event, a sudden stop event, and a hard turning event. The telematics information 242 may also identify the vehicle that provided the telematics information. Accordingly, the insurance customer associated with the vehicle that provided the telematics information 242 may be determined. The telematics information 242 may also indicate the date, time, and location at which these events occurred. It will thus be appreciated that the telematics analyzer 234 may determine whether a telematics event has a date, time, and location that matches (or is at least similar to) the date, time, and location of a share message 212, a share request 214, or another telematics event. In particular, the telematics analyzer 234 may determine whether a telematics event occurred on the same day, within a predetermined time period (e.g., 0-20 minutes), and within a predetermined distance (e.g., 0-100 feet) of a share message 212 or share request 214. If so, then the telematics analyzer 234 may conclude that the vehicle associated with the insurance customer was potentially involved in a vehicle incident that may result in an insurance claim. The telematics analyzer 234 may similarly notify the insurance information exchange handler 232, which may initiate the process of confirming with the individuals that the vehicle incident occurred and facilitating the exchange of insurance information between the individuals as described above.

The insurance system 204, in this example, is also in signal communication with a third-party insurance system 208 via the network 206. As seen in FIG. 2, the third-party insurance system 208 is located remotely relative to the insurance system 204. The third-party insurance system 208 may also collect and store sharing information and telematics information for its insurance customers. Accordingly, the sharing analyzer 230 and the telematics analyzer 234 may be configured to contact the third-party insurance system 208 if matching or similar share messages 212, share requests 214, or telematics events cannot be located at the data store 236 of the insurance system 204. In this way, the insurance system 204 may facilitate the electronic exchange of insurance information between individuals that do not have the same insurance provider.

In particular, the sharing analyzer 230 may submit a query to the third-party insurance system 208 to determine whether the third-party insurance system has sharing information corresponding to a share message 212 or share request 214 received at the insurance system 204. Accordingly, the query to the third-party insurance system 208 may include the time, date, and location of the share message 212 or share request 214. If the third-party insurance system 208 indicates that it has located sharing information that matches (or is at least similar to) the share message 212 or share request 214 received at the insurance system 204, then the insurance system may conclude that a third-party insurance customer was also involved in the vehicle incident. The insurance system 204 may thus request, and the third-party insurance system 208 may provide, insurance information for the third-party insurance customer such as, e.g., driver information, vehicle information, and insurance policy information relating to the third-party insurance customer. The telematics analyzer 234 may similarly submit a query to the third-party insurance system 208 that includes the time, date, and location of a detected telematics event. If the third-party insurance system 208 indicates that it has located telematics information the matches (or is at least similar to) the detected telematics event, then the insurance system 204 may likewise conclude that a third-party insurance customer was also involved in the vehicle incident. The third-party insurance system 208 may thus likewise provide the insurance system 204 with insurance information for the third-party insurance customer.

The insurance information exchange handler 232 may also be configured to query the third-party insurance system 208 to facilitate distribution of insurance information among individuals. As noted above, a share request 214 may include unique vehicle identifier of a vehicle such as a VIN or license plate number, and insurance information exchange handler 232 may perform a lookup on the data store 236 in order to identify the vehicle associated with the unique vehicle identifier and the owner associated with the vehicle. In some situations, however, the owner of the vehicle may not be a customer of the insurance company associated with the insurance system 204, and the insurance information exchange handler 232 may not be able to identify the owner of the vehicle. In these situations, the insurance information exchange handler 232 may query a third-party insurance system with the unique vehicle identifier received in the share request 214. The third-party insurance system 208 may thus also attempt to identify the vehicle and owner based on the unique vehicle identifier. Upon identifying the owner, a third-party insurance system 208 may provide the insurance system 204 with contact information for the owner such that the insurance system can transmit the insurance information associated with the individual that submitted the share request. In some example implementations, the insurance system 204 may transmit the insurance information to share to the third-party insurance system 208, and the third-party insurance system may transmit the insurance information to the owner on behalf of the insurance system. It will be appreciated that multiple insurance companies operating respective insurance systems may be interconnected to advantageously identify parties to potential incidents in this fashion.

The insurance system 204, in this example, also includes a settlement handler 235 that, in operation, facilitates settlements between individuals involved in a vehicle incident. In some situations, individuals involved in a vehicle incident may prefer to file an insurance claim and obtain payment for any damage through the typical claims process. In other situations, individuals may be willing to settle out-of-pocket. As used in this description, an individual that is responsible for the vehicle incident and thus liable to another individual is referred to as the at-fault party. As also used in this description the individual that is not responsible for the vehicle incident and to which another individual is liable is referred to as the non-fault party. The settlement handler 235 of the example insurance system 204 is configured to facilitate out-of-pocket payments between an at-fault party and a non-fault party. Accordingly, the settlement handler 235 may be configured to obtain a damage estimate for a vehicle involved in the incident, propose a settlement amount to both the at-fault party and the non-fault party, determine whether the settlement amount is acceptable to both the at-fault party and the non-faulty party, and facilitate a payment between the at-fault party and the non-fault party.

The settlement handler 235 may be configured to obtain the damage estimate based on vehicle telematics information received from the vehicles involved in the vehicle collision. Insurance companies may have compiled correlations between impact velocities and resulting repair costs. The telematics information 242 may indicate the velocity of the vehicles at the time of impact, and the settlement handler 235 may compare this telematics data to correlation information in order to obtain a damage estimate. The telematics information 242 may also include sensor information provided by sensors installed in the vehicle. The sensor information may indicate damage to various vehicle systems or components. Insurance companies may also have compiled correlations between damage to various vehicle systems and components and respective repair costs. The settlement analyzer 235 may also use this sensor information to obtain a damage estimate for the vehicle involved in the vehicle incident. In some example implementations, the settlement handler 235 may provide the telematics information 242 to the vehicle repair service system 210 via the network and receive the damage estimate in response.

Having obtained the damage estimate, the settlement handler 235 may transmit the damage estimate to the non-fault party in order to determine if the non-fault party would be willing to accept a settlement for an amount equaling the damage estimate. If the non-fault party accepts the settlement amount, then the settlement handler 235 may transmit the settlement amount to the at-fault party in order to determine if the at-fault party would be willing to settle out-of-pocket for the settlement amount. If both parties agree, then the settlement handler may facilitate a payment from the at-fault party to the non-fault party. As seen in FIG. 2, the insurance system 204, in this example, is in signal communication with a payment system 211. The payment system 211 may be a banking payment system, a credit card payment system, an e-commerce payment system, or other types of payment systems. The settlement handler 235 may facilitate the payment between the parties via this payment system 211. As described above, the settlement handler advantageously allows parties to settle out-of-pocket without filing an insurance claim with the insurance company that maintains the insurance system 204. The insurance company may thus avoid the overhead involved in initiating and processing an insurance claim. Unlike traditional out-of-pocket settlements, however, by facilitating the out-of-pocket settlement through the settlement handler, the insurance company is aware of the vehicle incident and may utilize the incident information for subsequent risk analysis with respect to the insurance customers.

The system 200 for facilitating and responding to the sharing and exchange of insurance information is shown by way of example in FIG. 2. Other implementations of the system may include additional or alternative components that provide additional or alternative features. Furthermore, other implementations of the system may employ alternative approaches to sharing insurance information, exchanging insurance information, and responding to the sharing or exchange of insurance information.

Figure 3:
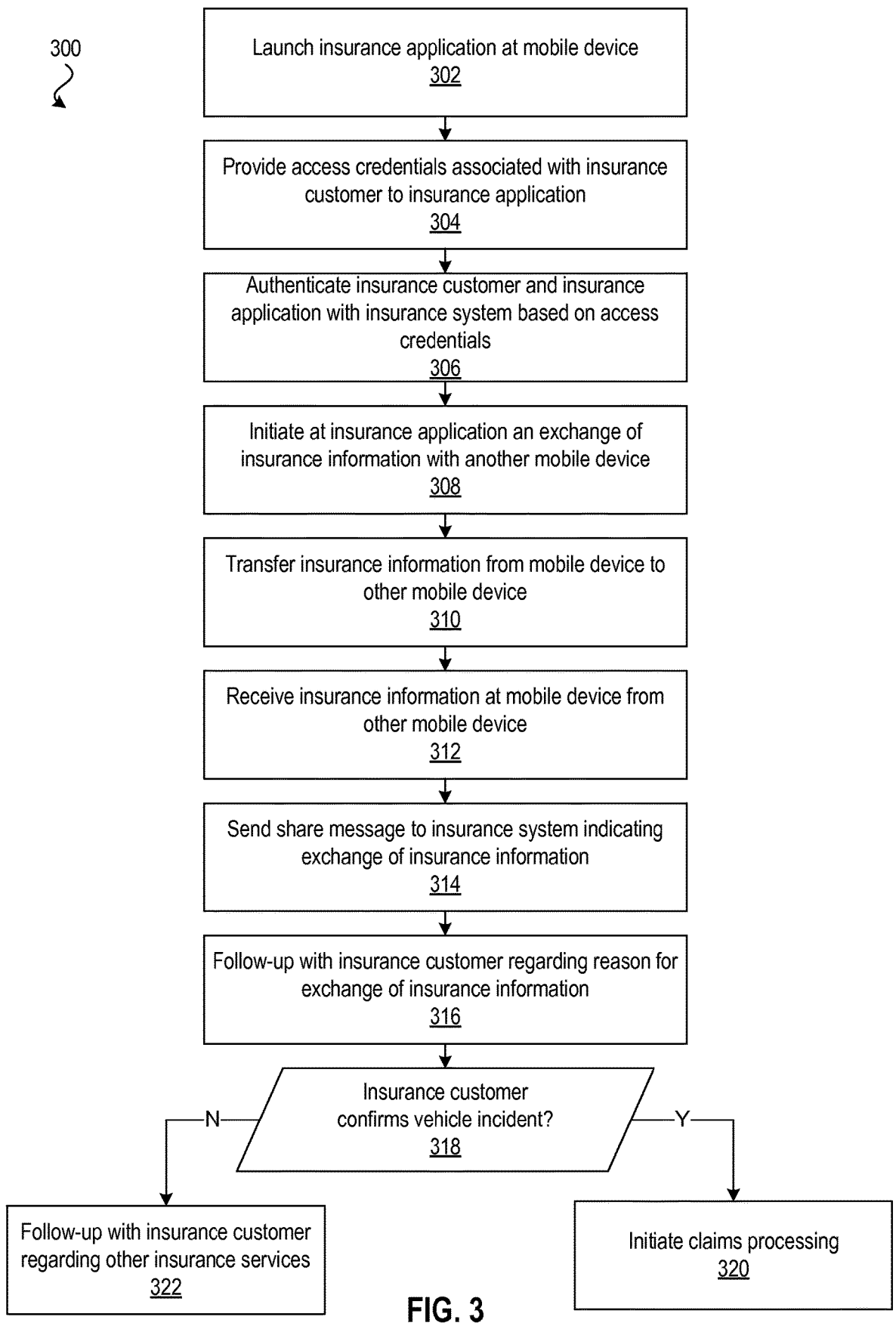
FIG. 3 a flowchart of example method steps for exchanging insurance information and responding to the exchange of insurance information.

Referring now to FIG. 3, a flowchart 300 of example method steps for exchanging insurance information and responding to the exchange of insurance information is shown. An insurance customer may install and launch an insurance application at a mobile device such as a mobile phone (block 302). The insurance application may require the insurance customer to login by providing access credentials (e.g., a username and password) associated with the insurance customer (block 304). The insurance application may then contact an insurance system to authenticate the insurance customer based on the access credentials provided (block 306). Once authenticated, the insurance system may associate a customer profile for the insurance customer with the mobile device of the insurance customer and the insurance application operating at the mobile device, e.g., through a communication session established between the insurance application and the insurance system.

Having logged in to the insurance application, the insurance customer may utilize the insurance application to electronically exchange insurance information with an electronic device of another individual, e.g., another mobile device. Accordingly, an insurance customer may initiate an insurance information exchange with another mobile device (block 308). The insurance customer may initiate the exchange of insurance information accordingly to one of the various approaches described above, e.g., via a bump gesture between the devices. During the exchange, the mobile device may transfer insurance information to the other mobile device (block 310) and receive insurance information from the other mobile device (block 312). As noted above, the insurance information may be stored at the mobile device such that the insurance information is available for transfer on demand.

Following the exchange of insurance information, the insurance application may transmit a share message to the insurance system (block 314) as described above. Because individuals may exchange insurance information following a vehicle incident such as a collision, the insurance system may initiate a follow-up communication with the insurance customer to inquire about the reason behind the insurance information exchange (block 316). The follow-up may be, e.g., a phone call from an insurance agent or one or more messages automatically presented at the mobile device via the insurance application. In some example implementations, the follow-up from the insurance system may be automated. The insurance system may, for example, transmit instructions to the insurance application at the mobile device instructing the mobile application to gather additional information regarding the potential incident. In response to the instructions received from the insurance system, the mobile application may ask the insurance customer a series of questions, e.g.: "Were you involved in a vehicle collision?"; "Do you need medical assistance?"; "Was anyone else involved?"; "Would you like to file an insurance claim?"; "Do you need vehicle towing or rental service?" Along with the instructions, the insurance system may provide a set of questions to the mobile application to present to the insurance customer. The insurance customer may thus provide answers to the questions presented, and the insurance application may transmit a set of answers back to the insurance system as a response, which may in turn provide the set of answers to an insurance agent of the insurance company.

The insurance system may also initiate various responses automatically based on the answers provided by the insurance customer (e.g., automatically creating an insurance claim). For example, the set of questions presented to the insurance customer may ask the customer to confirm a vehicle incident occurred (block 318). If the insurance customer confirms that an incident occurred (block 318:Y), then the insurance system may initiate the claims processing procedure (block 320), e.g., by elevating a placeholder insurance claim automatically created in response to the share message. If the insurance customer indicates that a vehicle collision did not occur (block 318:N), then the insurance system may follow-up with the insurance customer regarding other insurance services that may be of interest to insurance customer (block 322).

Figure 4:
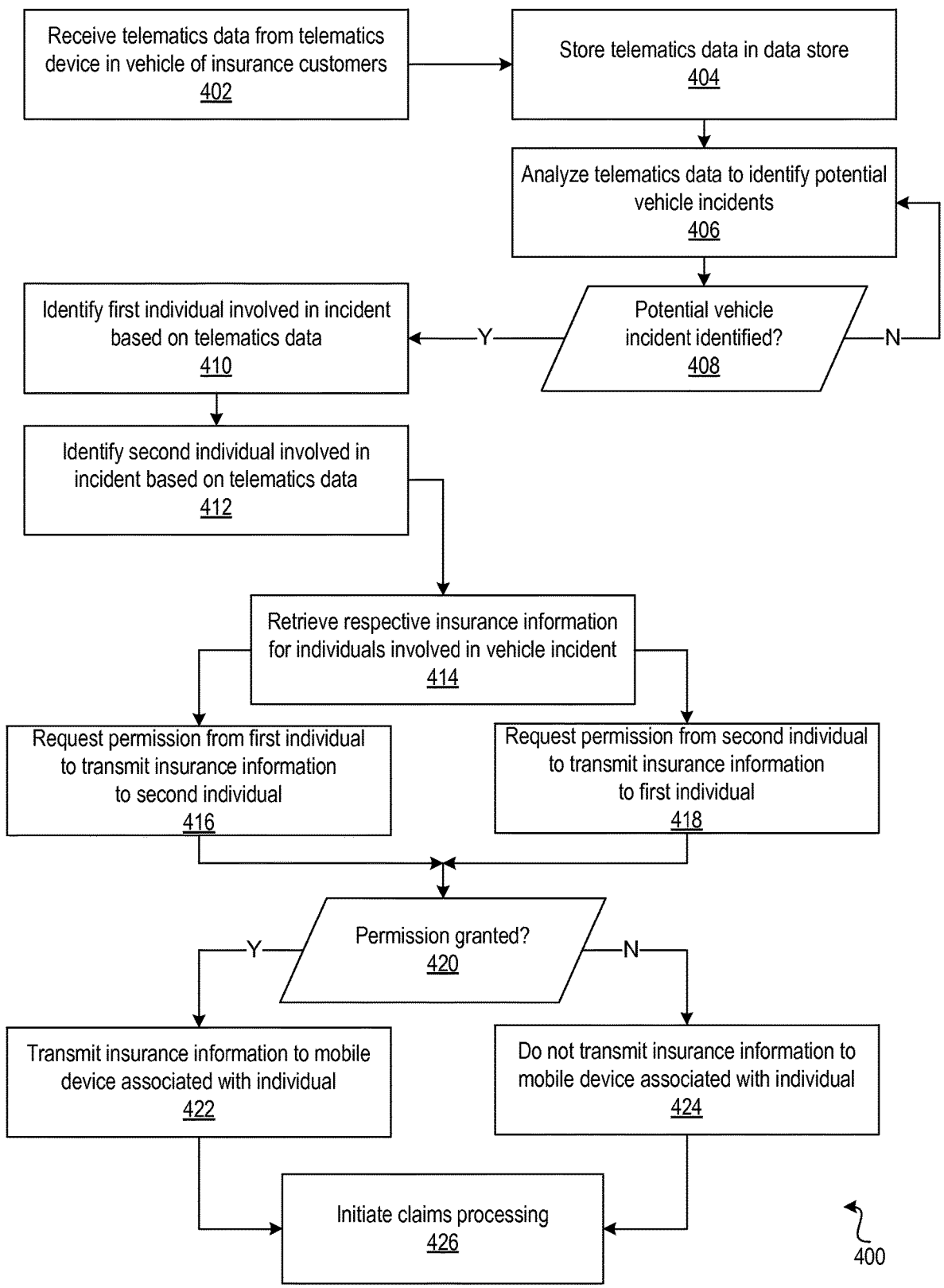
FIG. 4 is a flowchart of example method steps for facilitating the exchange of insurance information in response to a vehicle incident detected through an analysis of telematics information.

In FIG. 4, a flowchart 400 for facilitating the exchange of insurance information in response to a vehicle incident detected through an analysis of telematics information is shown. As described above, an insurance system may receive telematics data from a telematics device installed in a vehicle of an insurance customer (block 402). The insurance system may store the received telematics data in a data store (block 404) and periodically analyze the telematics information stored in the data store in order to identify potential vehicle incidents (block 406). The insurance system may analyze the telematics data as it is received or at periodic intervals, e.g., every 30-60 seconds. If the insurance system does not identify a potential vehicle incident (block 408:N), then the insurance system may repeat step 406 until a potential telematics event is detected.

Upon detection of a potential telematics event (block 408:Y), the insurance system may identify an insurance customer involved in the potential vehicle incident based on the telematics data (block 410). As described above, the telematics data may identify the vehicle at which the telematics unit is installed, and information associated with the vehicle may identify the owner of the vehicle. As also described above, the insurance system may identify an additional insurance customer involved in the potential vehicle incident based on matching (or similar) telematics data received from a telematics unit installed in a vehicle of the additional insurance customer (block 412).

Having identified one or more insurance customers, the insurance system may retrieve the respective insurance information associated with each insurance customer determined to be involved in the potential vehicle incident (block 414). As noted above, the insurance system may request permission from the insurance customers before distributing the insurance information. Accordingly, the insurance system may request permission from a first insurance customer to transmit the first customer's insurance information to the second insurance customer (block 416), and the insurance system may request permission from the second insurance customer to transmit the second customer's insurance information to the first customer (block 418). If an insurance customer gives permission (block 420:Y), then the insurance system may transmit the insurance customer's insurance information to an electronic computing device (e.g. a mobile device) of the other insurance customer (block 422). If, however, an insurance customer does not give permission (block 420:N), then the insurance system may refrain from transmitting the insurance customer's insurance information to another individual (block 424). If an insurance customer does not give permission, the insurance customers may exchange insurance information through traditional means, e.g., pen and paper. After the insurance customers have exchanged insurance information, the claims processing procedure may be initiated (block 426). It will be appreciated that some of the example steps described above may be repeated, e.g., steps 410-424, in order to identify additional individuals involved in the vehicle incident.

In FIGS. 5A-D, example screenshots 500a-d of an insurance application are respectively shown at mobile device 502a-d. The screenshots 500a-d may be respectively presented to two individuals involved in the same vehicle incident during an exchange of insurance information. As seen in the screenshots 500a-b, an insurance system has detected that the individuals were involved in a the same vehicle incident, and has notified each individual of such detection. As also seen in the screenshots 500a-b, the insurance system has asked each individual for permission to provide that individual's insurance information to the other individual. At the mobile device 502a, the insurance system has asked the first individual for permission to provide the first individual's insurance information to the second individual. Similarly, the insurance system has asked the second individual for permission to provide the second individual's insurance information to the first individual. An individual may grant or deny permission by providing input at the user interface of the insurance application, e.g., by selecting "YES" or "NO" at the user interface.

Figure 5A:
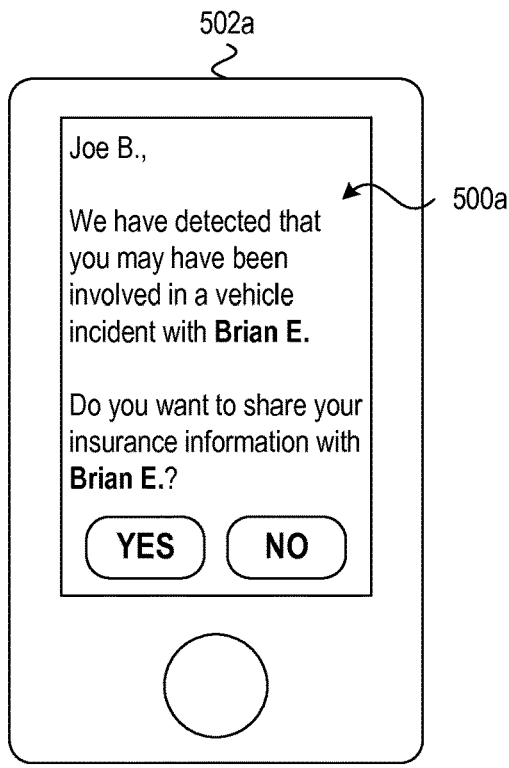
FIGS. 5A-D are respective example insurance application screenshots that may be presented to during an exchange of insurance information.
Figure 5B:
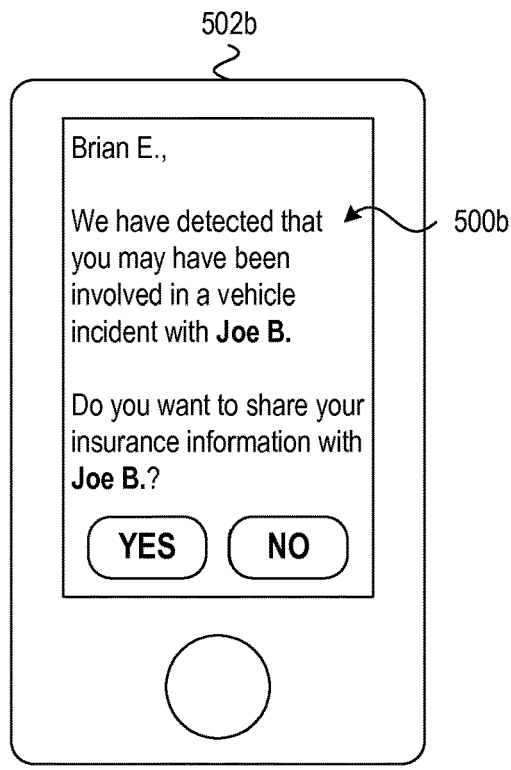
Figure 5C:
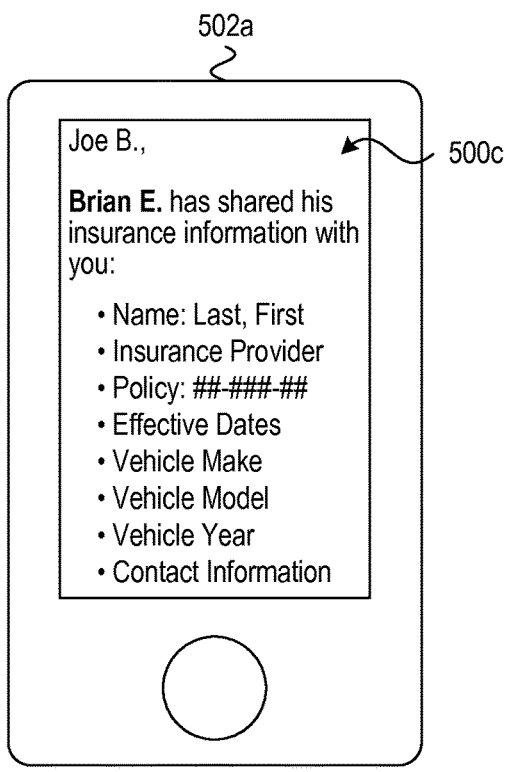
Figure 5D:
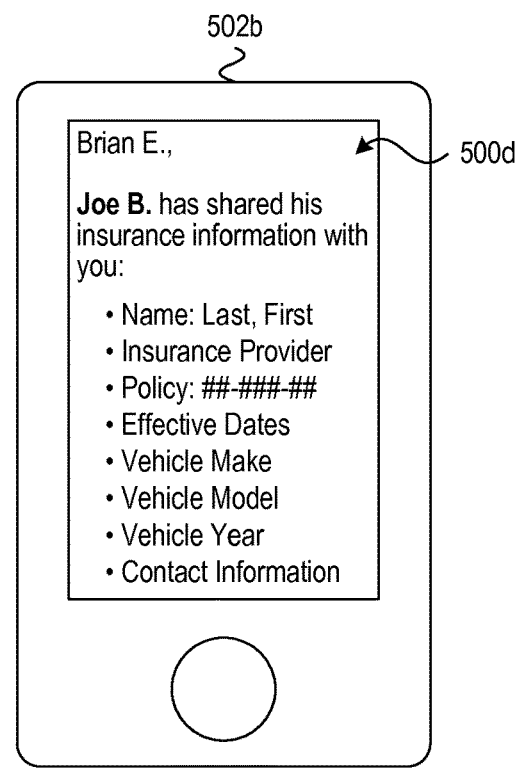

FIGS. 5C-D show example screenshots 500*c-d* at the mobile devices 502*a-b* when each individual, in this example, grants permission to provide insurance information to the other individual. The insurance information for the second individual has been received and presented at the mobile device 502*a* of the first individual as seen in screenshot 500*c*. Similarly, the insurance information for the first individual has been received and presented at the mobile 502*b* of the second individual as seen in screenshot 500*d*. As shown by way of example in screenshots 500*c-d*, the insurance information may include the name of the individual; the name of the insurance provider; the insurance policy number; the insurance policy effective dates; the vehicle make, model, and year; and the contact information of the named individual. The information may include additional or alternative types of information, and the screenshots may have alternative configurations.

Referring now to FIG. 6, a flowchart 600 of example method steps for sharing insurance information from one individual to another individual. The steps of the flowchart 600 may be performed when, for example, an individual damages an unoccupied vehicle and does not know the identity of the vehicle owner. An individual may launch the insurance application as described above and initiate a request to share insurance information with another individual (block 602), e.g., the owner of the unoccupied vehicle. In this example, the insurance application may prompt the individual to identify the vehicle to the insurance system (block 604). The individual may identify the vehicle to the insurance system using, e.g., the VIN or license plate number of the vehicle. As described above, the insurance application may provide the VIN or license plate number to the insurance system in a share request. In response to receipt of the share request, the insurance system may determine the owner of the vehicle (block 606) and retrieve the contact information for the owner of the vehicle (block 608) as described above. The insurance system may retrieve the insurance information associated with the individual making the request (block 610) and transmit the insurance information to the owner of the vehicle (block 612).

It will be appreciated that some of the steps set forth above may also be employed to share insurance information with a recipient where the sender does know the identity of the recipient. Accordingly, an additional step may be performed asking the sending if the identity of the recipient is known. If so, an alternative step may be performed in which the insurance application prompts the sender for information that uniquely identifies the sender, e.g., a phone number, email address, driver's license number, and so forth.

In FIGS. 7A-C, example screenshots 700*a-c* of insurance applications are respectively shown at mobile devices 702*a-b*. The mobile device 702*a* may be associated with an individual that desires to share insurance information with another individual associated with mobile device 702*b*. As seen in the screenshot 700*a*, the insurance application prompts the individual to select an option to exchange insurance information with another individual or send insurance information to another individual. As seen in the screenshot 700*b*, the individual has selected the option to send insurance information to another individual based on the vehicle associated with that individual. Accordingly, the screenshot 700*b*, in this example, prompts the individual to provide information that uniquely identifies the vehicle, e.g., a VIN or license plate number, and provides input elements to receive the VIN or license plate number. The insurance application may include the information identifying the vehicle in a share request to the insurance system as described above. In some example embodiments, the individual may obtain a digital photo of the VIN or license plate, and the insurance application may include the photo in the share request to the insurance system. The insurance system may be configured to recognize the text in the photo in order to extract the VIN or license plate number. Having identified the owner of the vehicle, the insurance system may notify the owner, e.g., at the insurance application operating at a mobile device 702*b* of the owner. As seen in the example screenshot 700*c*, the insurance application may inform the recipient that another individual has requested to share insurance information, and the insurance application may prompt the user to accept or reject the shared insurance information. If the recipient accepts, the insurance application may present the shared insurance information as shown in FIG. 5C.

Figure 8:
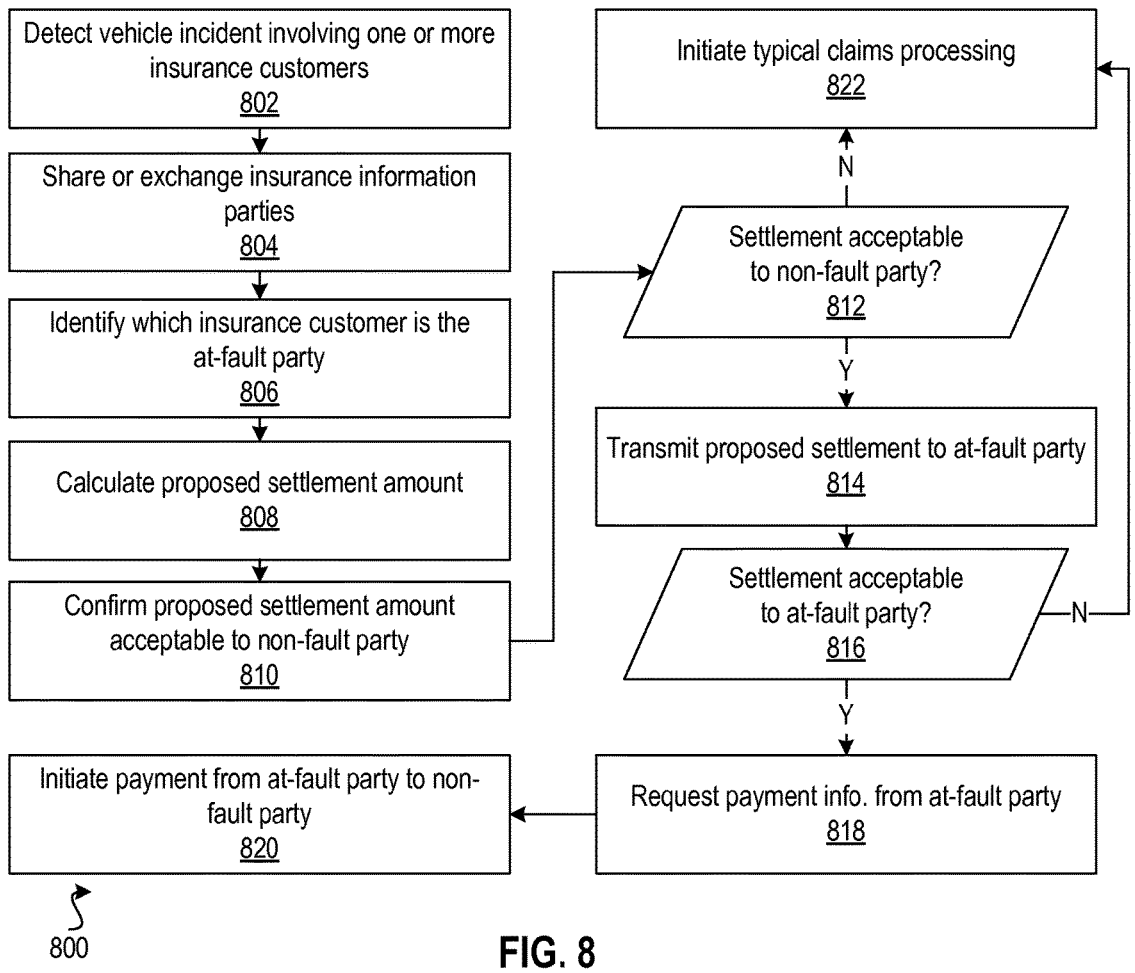
FIG. 8 is a flowchart of example method steps for facilitating an out-of-pocket settlement between parties.

In FIG. 8, a flowchart 800 of example method steps for facilitating out-of-pocket settlements is shown. An insurance system may detect a vehicle incident involving one or more insurance customers (block 802). The insurance system may detect the vehicle incident through an analysis of telematics data, receipt of a share message or share request, or upon confirmation from an insurance customer as described above. As a result of the vehicle incident, the parties involved in the incident may share or exchange insurance information (block 804) as described above. The insurance system may identify which insurance customers were involved in the incident (block 806) and calculate a proposed settlement amount (block 808). The insurance system may identify the parties involved in the incident also based on an analysis of the telematics data or based on receipt of a share message or share request. The insurance system may calculate a proposed settlement amount based on the telematics data or based on an estimate received from a vehicle repair service system in response to a query as described above.

The insurance system may then transmit the proposed settlement amount to the non-fault party in order to confirm the proposed settlement amount is acceptable to the non-fault party (block 810). The insurance application operating at the mobile device of the non-fault party may receive the proposed settlement amount and present the proposed settlement amount to the non-fault party. The non-fault party may then provide input at the insurance application accepting or rejecting the proposed settlement amount. The insurance application may then then transmit a message to the insurance system indicating whether the non-fault party accepted or rejected the proposed settlement amount. If the non-fault party accepts the proposed settlement amount (block 812: Y), then the insurance system may transmit the proposed settlement to the at-fault party (block 814) for presentation via an insurance application operating at a mobile device of the at-fault party. The insurance application may also prompt the at-fault party to accept or reject the proposed settlement amount. The at-fault party may thus provide input at the insurance application accepting or rejecting the proposed settlement amount, and the insurance application may transmit a message to the insurance application indicating whether the at-fault party accepted or rejected the proposed settlement amount. If the at-fault party accepts the proposed settlement amount (block 816:Y), then the insurance application may prompt the at-fault party to provide payment information (block 818). The insurance application may transmit the payment information received from the at-fault party to the insurance system, which may then initiate a payment between the at-fault party and the non-fault party (block 820), e.g., via the payment system described above with reference to FIG. 2.

If the non-fault party rejects the proposed settlement amount (block 812:N) or the at-fault party rejects the proposed settlement amount (block 816:N), then the insurance system may initiate the typical claims processing procedure. It will also be appreciated that the insurance system and insurance application may be configured to facilitate negotiation of a settlement amount between the at-fault party and the non-fault party. During settlement negotiations, the at-fault party or the non-faulty party may propose a different settlement amount (e.g., a counteroffer) via the insurance application and the insurance system may transmit the different settlement amounts between the parties for acceptance or rejection.

Figures 9A, 9B, 9C:
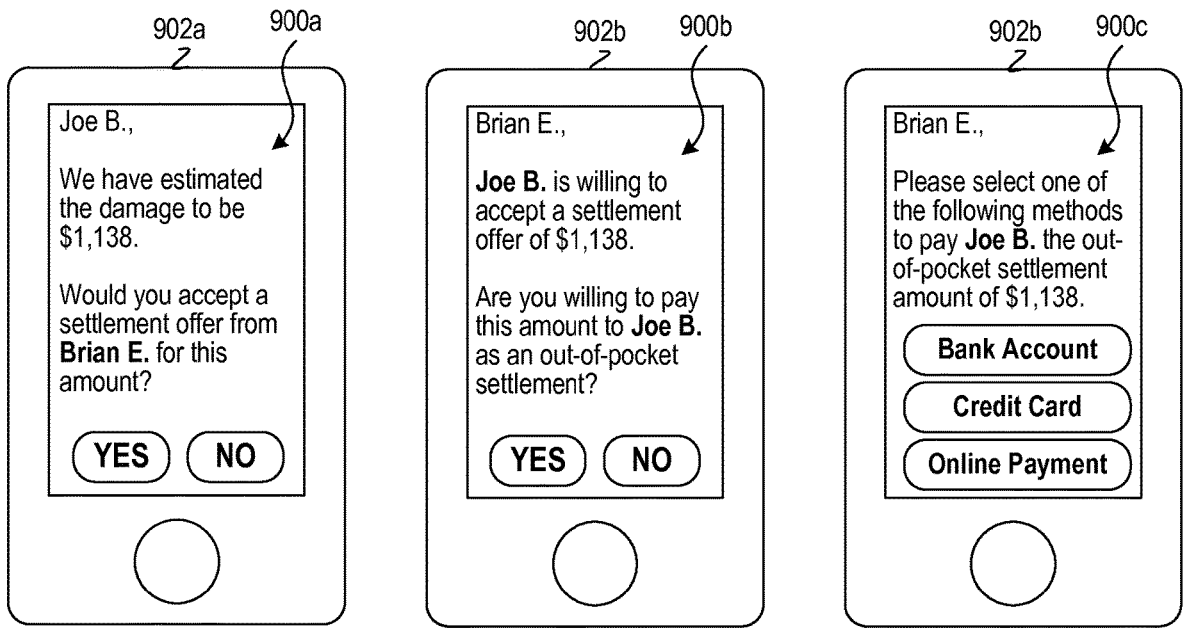
FIGS. 9A-C are example insurance application screenshots that may be presented when facilitating an out-of-pocket settlement.

FIGS. 9A-C illustrate example screenshots 900a-c of insurance applications at respective mobile devices 902a-b. The mobile device 902a may be associated with a non-fault party involved in a vehicle incident, and the mobile device 902b may be associated with an at-fault party involved in the vehicle incident. As seen in the screenshot 900a, the insurance application has presented a proposed settlement amount to the non-fault party and has asked the non-fault party to accept or reject the proposed settlement amount. The non-fault party may accept or reject the proposed settlement amount by selecting one of the buttons at the user interface of the insurance application. The screenshot 900b may be presented to the at-fault party if the non-fault party accepts the proposed settlement amount. As seen in the screenshot 900b, the insurance application likewise has presented the proposed settlement amount to the at-fault party and has asked the at-fault party to accept or reject the proposed settlement amount by selecting one of the buttons of the user interface. The screenshot 900c may be presented to the at-fault party if the at-fault party accepts the proposed settlement amount. As seen in the screenshot 900c, the insurance application has prompted the at-fault party to select a payment method with which to pay the non-fault party. As noted above, the insurance application and insurance system may facilitate payments between the parties via and electronic bank account transfer, a credit card payment, or an online e-commerce payment. In this way, non-fault parties may advantageously be compensated without filing an insurance claim.

Figure 10:
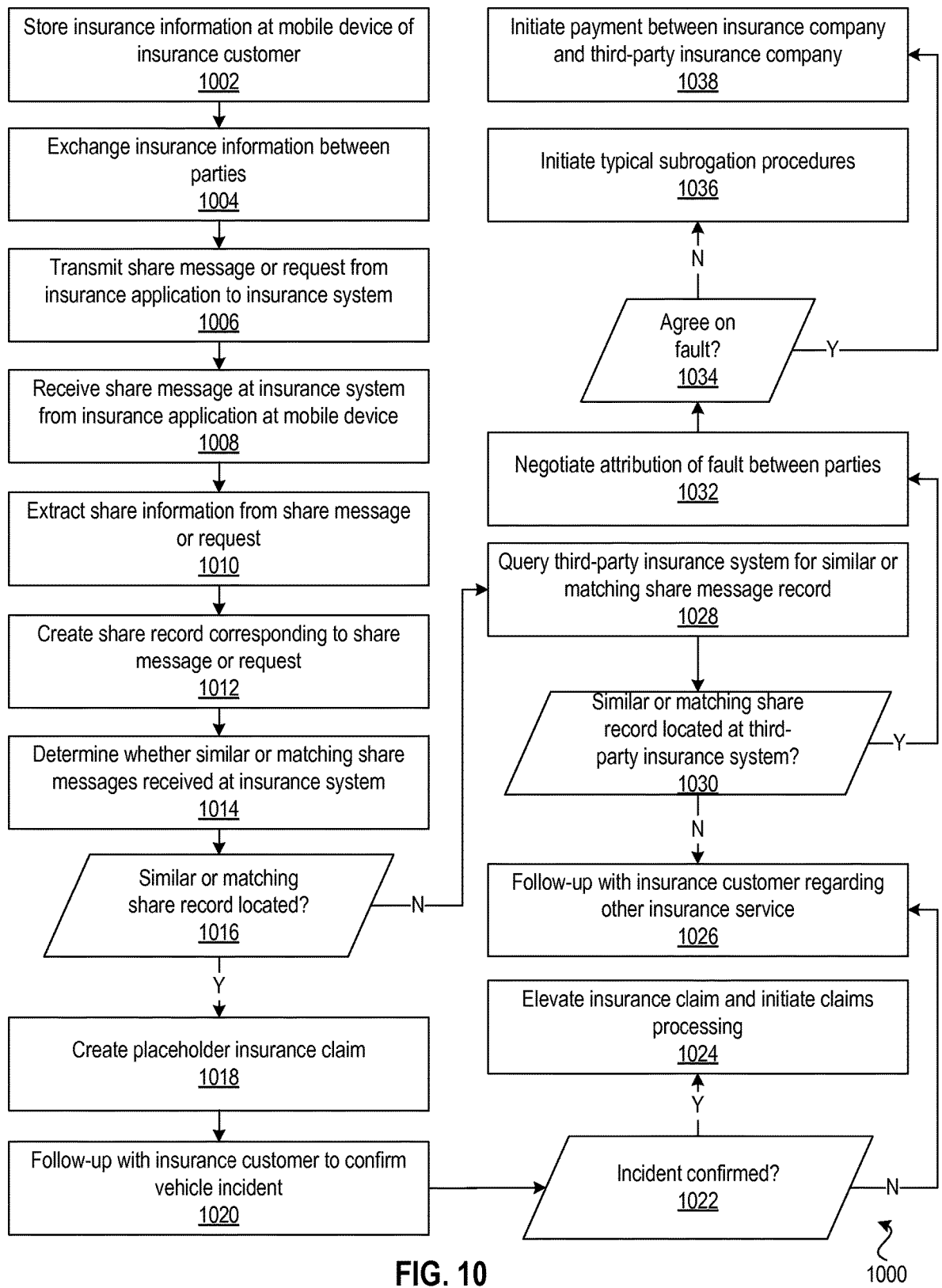
FIG. 10 is another flowchart of example method steps for responding to an exchange of insurance information.

With reference to FIG. 10, a flowchart 1000 of example method steps for responding to an exchange of insurance information is shown. An insurance system may store insurance information associated with multiple insurance customers (block 1002). An insurance customer may share or exchange insurance information with another insurance customer (block 1004) causing a share message or share request to be sent from an insurance application to the insurance system (block 1006) as described above. The insurance system may receive the share message or share request (block 1008), extract the information from the share request or share message (block 1010), and create a share record based on the extracted share information (block 1012). The insurance system may then query the share records to for any matching or similar share messages previously received (block 1014). As described above, share records may be matching or similar where the share records have matching or similar times, dates, and locations. If the insurance system locates matching or similar share records (block 1016:Y), then the insurance system may conclude that a potential vehicle incident occurred and automatically create a placeholder insurance claim (block 1018) and populate the placeholder insurance claim with basic customer information associated with individuals involved in the potential vehicle incident. The insurance customers may then be contacted to confirm that the vehicle incident occurred (block 1020). As described above, the insurance system may transmit instructions to an insurance application at the mobile device of an insurance customer that causes the insurance application to present a list of questions to the insurance customer prompting the insurance customer to confirm or deny the vehicle incident. Additionally or alternatively, the insurance system may notify an insurance agent of the potential vehicle incident, and the insurance agent may follow-up with the individuals involved in the vehicle incident. If the insurance customer confirms that the vehicle incident occurred (block 1022:Y), then the placeholder insurance claim may be elevated to a confirmed insurance claim and the claims processing procedure may be initiated (block 1024). If the insurance customer indicates that a vehicle incident did not occur (block 1022:N), then the placeholder insurance claim may be discarded the insurance system or insurance agent may follow-up with the individual regarding other insurance services that may be of interest to the individual (block 1026).

If the insurance system cannot locate a matching or similar share record at its own data store (block 1016:N), the insurance system may query a third-party insurance system for a matching or similar share record (block 1028) as described above. If the third-party insurance system cannot locate a matching or similar share record (block 1030:N), the insurance system may initiate a follow-up with the insurance customer (block 1026) regarding other insurance services as described above. If the third-party insurance system can locate a matching or similar record (block 1030:Y), then the insurance system may conclude that a vehicle incident occurred with a third-party insurance customer. The insurance system may initiate a fault attribution process with the third-party insurance system (block 1032). For example, the insurance system may exchange telematics data with the third-party insurance system to determine which insurance customer is the at-fault party. Through an analysis of the telematics data the insurance system and the third-party insurance system may attribute fault to one of the individuals involved in the vehicle incident. If the insurance systems do not agree on which individual is the at-fault party (1034:N), typical subrogation procedures may be initiated (block 1036). If, however, the insurance systems agree on which individual is the at-fault party (block 1034:Y), then payment between the insurance systems may be initiated (block 1038). In this way, the insurance system may automate at least a portion of the subrogation process.

Figure 11A:
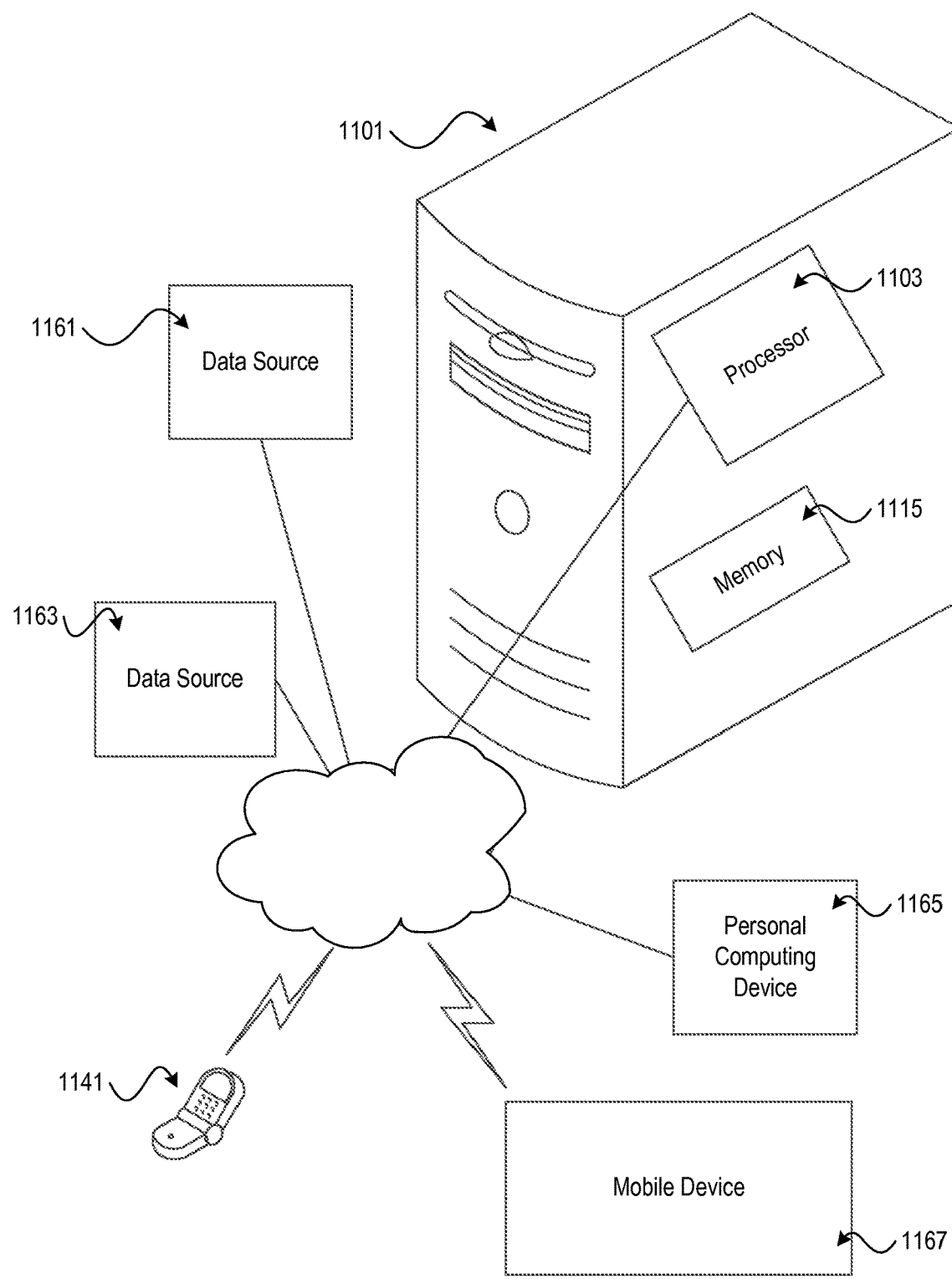
FIG. 11A is an example of an implementation of a suitable operating environment in which various aspects of the disclosure may be implemented.

Referring to FIG. 11A, an example of an implementation of a suitable operating environment in which various aspects of the disclosure may be implemented is shown. The operating environment is only one example of a suitable operating environment and is not intended to suggest any limitation as to the scope of use or functionality of the disclosure. The operating environment may be comprised of one or more data sources 1161, 1163 in communication with a computing device 1101. The computing device 1101 may use information communicated from the data sources 1161, 1163 to generate values that may be stored in a database format. In one embodiment, the computing device 1101 may be a high-end server computer with one or more processors 1103 and one or more memories 1115 for storing and maintaining the values generated. The memories 1115 storing and maintaining the values generated need not be physically located in the computing device 1101. Rather, the memories (e.g., ROM 1107, RAM 1105, flash memory, hard drive memory, RAID memory, and the like) may be located in a remote data store (e.g., memory storage area 227) physically located outside the computing device 1101, but in communication with the computing device 1101.

A personal computing device 1165 (e.g., a personal computer, tablet PC, handheld computing device, personal digital assistant, mobile device, etc.) may communicate with the computing device 1101. Similarly, a mobile device 1167 (e.g., a mobile cellular telephone, palmtop computer, tablet computer, laptop computer, and the like) may communicate with the computing device 1101. The communication between the computing device 1101 and the other devices 1165, 1167 may be through wired or wireless communication networks or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 1101 and other devices (e.g., devices 1165, 1167) may be connected to one or more of the networks via twisted pair wires, coaxial cable, fiber optics, radio waves or other media. The term "network" as used herein and depicted in the drawings should be broadly interpreted to include not only systems in which devices or data sources are coupled together via one or more communication paths, but also stand-alone devices that may be coupled, from time to time, to such systems that have storage capability.

In another embodiment in accordance with aspects of the disclosure, a mobile device 1167 may operate in a stand-alone manner by locally storing some of the database of values stored in the memories 1115 of the computing device 1101. For example, a mobile device 1167 (e.g., a mobile cellular telephone) may be comprised of a processor, memory, input devices 1168, and output devices 1169 (e.g., keypad, display screen, speaker, and the like). The memory may be comprised of a non-volatile memory that stores a database of values. Therefore, the mobile device 1167 need not communicate, in one example, with a computing device 1101 located at a remote location. Rather, the mobile device 1167 may behave in a stand-alone manner and use its processor to perform particular steps disclosed herein. If desired, the mobile device 1167 may be refreshed with an updated database of values after a period of time.

In yet another embodiment in accordance with aspects of the disclosure, a personal computing device 1165 may operate in a stand-alone manner by locally storing some of the database of values stored in the memory of the computing device. For example, a personal computing device 1165 may be comprised of a processor, memory, input device (e.g., keypad, CD-ROM drive, DVD drive, etc.), and output device (e.g., display screen, printer, speaker, etc.). The memory may be comprised of CD-ROM media. Therefore, the personal computing device 1165 may use the input device to read the contents of the CD-ROM media. Rather, the personal computing device 1165 may behave in a stand-alone manner and use its processor to perform particular steps disclosed herein. If desired, the personal computing device may be provided with an updated database of values (e.g., in the form of updated CD-ROM media) after a period of time.

The data sources 1161, 1163 may provide information to the computing device 1101. In one embodiment in accordance with aspects of the disclosure, a data source may be a computer which contains memory storing data and is configured to provide information to the computing device 1101. Some examples of providers of data sources in accordance with aspects of the disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data sources 1161, 1163 may be restricted to only authorized computing devices 1101 and for only permissible purposes. For example, access to the data sources may be restricted to only those persons or entities that have signed an agreement (e.g., an electronic agreement) acknowledging their responsibilities with regard to the use and security to be accorded this information.

The computing device 1101 may use the information from the data sources 1161, 1163 to generate values that may be used to facilitate the sharing and exchange of insurance information and respond to messages indicating the sharing or exchange of insurance information. Some examples of the information that the data sources may provide to the computing device 1101 include, but are not limited to, accident information, geographic information, and other types of information useful to share and exchange insurance information as well as provide other insurance-related services.

Figure 11B:
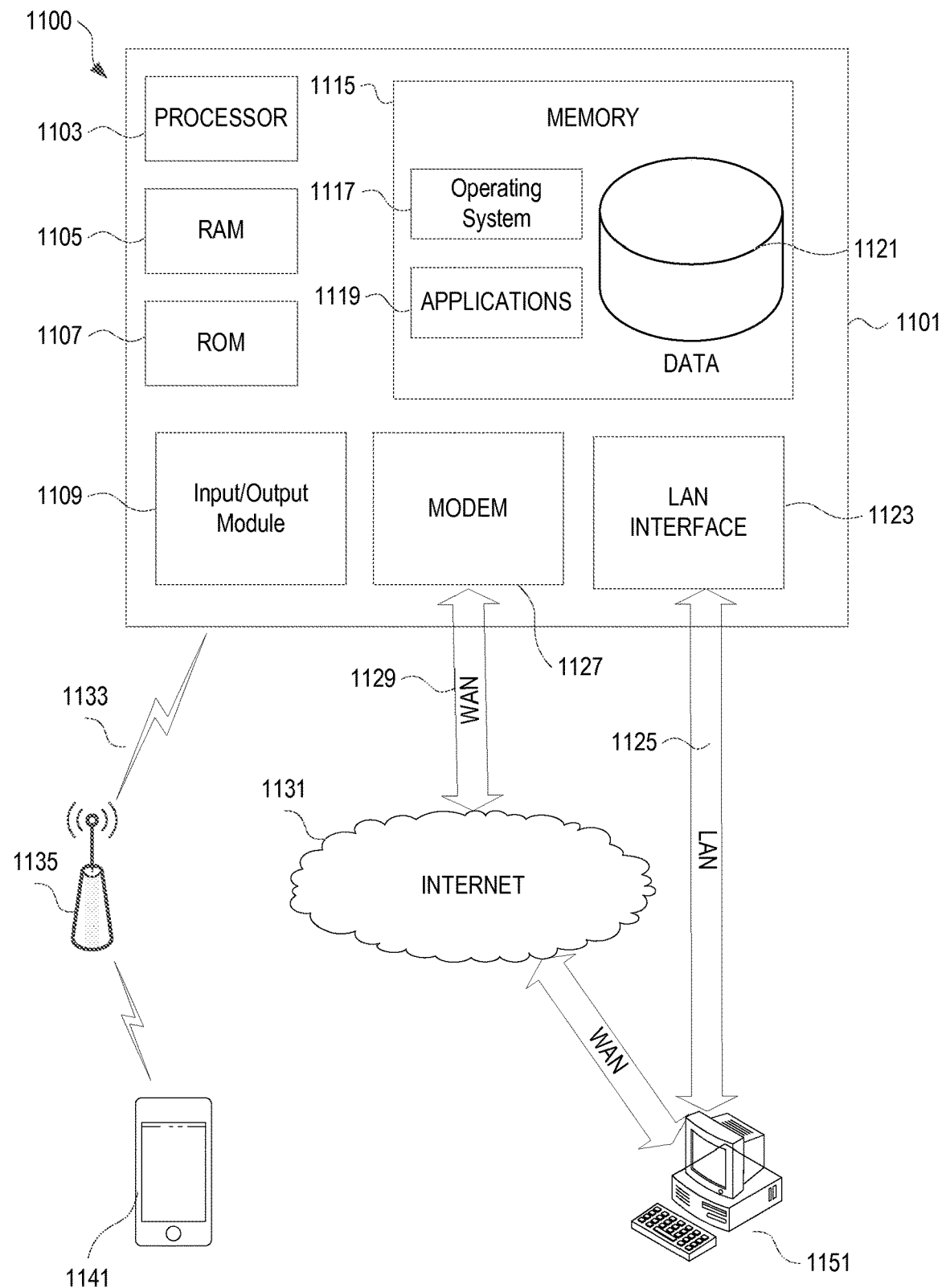
FIG. 11B is a block diagram of a system that may be used according to one or more example embodiments of the disclosure.

FIG. 11B illustrates a block diagram of a computing device (or system) 1101 in the communication system 1100 that may be used according to one or more illustrative embodiments of the disclosure. The device 1101 may have a processor 1103 for controlling overall operation of the device 1101 and its associated components, including RAM 1105, ROM 1107, input/output (I/O) module 1109, and memory 1115. The computing device 1101, along with one or more additional devices (e.g., terminals 1141, 1151) may correspond to any of multiple systems or devices, such as a system for facilitating and responding to the sharing and exchange of insurance information (FIG. 2) as described herein.

I/O module 1109 may include a microphone, keypad, touch screen, and/or stylus through which a user of the computing device 1101 may provide input, and may also include one or more of a speaker for providing audio output and a video display device for providing textual, audiovisual or graphical output. Software may be stored within memory 1115 or storage to provide instructions to processor 1103 for enabling device 1101 to perform various functions. For example, memory 1115 may store software used by the device 1101, such as an operating system 1117, application programs 1119, and an associated internal database 1121. Processor 1103 and its associated components may allow the system to execute a series of computer-readable instructions to, e.g., share or exchange insurance information as well as receive and respond share messages and share requests.

The system may operate in a networked environment supporting connections to one or more remote computers, such as terminals 1141 and 1151. The terminals 1141 and 1151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the system 1101. The network connections may include a local area network (LAN) 1125 and a wide area network (WAN) 1129, and a wireless telecommunications network 1133, but may also include other networks. When used in a LAN networking environment, the system may be connected to the LAN 1125 through a network interface or adapter 1123. When used in a WAN networking environment, the system 1101 may include a modem 1127 or other means for establishing communications over the WAN 1129, such as network 1131 (e.g., the Internet). When used in a wireless telecommunications network 1133, the system 1101 may include one or more transceivers, digital signal processors, and additional circuitry and software for communicating with wireless computing devices 1141 (e.g., mobile phones, vehicle telematics devices) via one or more network devices 1135 (e.g., base transceiver stations) in the wireless network 1133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and system components described herein may be configured to communicate using any of these network protocols or technologies.

Additionally, one or more application programs 1119 used by the system may include computer executable instructions (e.g., insurance information sharing and exchange programs) for sharing and exchanging insurance information, responding to share messages and share requests, and performing other related functions as described herein.

In view of the example approaches set forth above, alternative approaches to sharing and exchanging insurance information will be appreciated. In one alternative approach, an individual may use an insurance application at a mobile device to indicate a vehicle incident has occurred. The insurance application may retrieve geographic location information from a GPS unit at the mobile device and transmit a message to an insurance system. The message may include the location information. In response to receipt of the message, the insurance system may search for other messages having similar or matching location information (e.g., within thirty feet). If the insurance system locates message having matching or similar location information, then the insurance system may determine that the individuals associated with those messages were participants in the same vehicle incident. In response, the insurance system may facilitate the sharing or exchange of insurance information between those individuals as described above.

In another example approach, an individual may notify an insurance system without the use of an insurance application at a mobile device. Instead, the individual may send a text message such as a Short Message Service (SMS) text message to the insurance system wherein the text message includes the phone number of another individual to share insurance information with. In response to receipt of the text message, the insurance system may perform a lookup of insurance information based on the phone number the text message was received from, extract the phone number of the intended recipient from the text message, and transmit the insurance information to the recipient in a text message using the phone number of the recipient.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure.

What is claimed is:

1. A computing device for processing telematics data to identify individuals associated with a vehicle-based event, the device comprising:
   one or more processors;
   a data store that stores insurance policy information and vehicle telematics information; and
   memory storing computer-executable instructions that, when executed by at least one of the one or more processors, causes the computing device to:
   (a) receive, from telematics devices of a plurality of vehicles, the vehicle telematics information regarding vehicle status and including movement characteristics of the plurality of vehicles,
   (b) store the vehicle telematics information at the data store,
   (c) analyze the vehicle telematics information to determine whether a vehicle incident involving two vehicles has occurred based on the vehicle status and movement characteristics of the plurality of vehicles, and
   (d) responsive to a determination that a first vehicle has been involved in the vehicle incident and prior to identifying a second vehicle involved in the vehicle incident:
      identify the first vehicle involved in the vehicle incident as well as a date, a time, one or more vehicle movement characteristics of the first vehicle and a geographic location of the vehicle incident based on the vehicle telematics information received from a telematics device of the first vehicle,
      identify a first individual involved in the vehicle incident based on a first portion of the vehicle telematics information received from and specific to the first vehicle of the plurality of vehicles,
   after identifying the first individual involved in the vehicle incident:
      identify the second vehicle involved in the vehicle incident and a second individual associated with the second vehicle based on a second portion of the vehicle telematics information received from and specific to the second vehicle of the plurality of vehicles by comparing telematics data of the first and second vehicles and determining whether each of a second date, a second time, a second vehicle movement characteristic and a second geographic location of the second portion of the vehicle telematics information is similar to or matches the date, the time, at least one of the one or more vehicle movement characteristics and the geographic location of the vehicle incident, respectively, to confirm that the second vehicle was involved in the vehicle incident,
      retrieve, from the data store, a first portion of the insurance policy information that is associated with the first individual and a second portion of the insurance policy information that is associated with the second individual,
      initiate transmission of the second portion of the insurance policy information to a first mobile computing device associated with the first individual, the first mobile computing device being different from the telematics devices, and initiate transmission of the first portion of the insurance policy information to a second mobile computing device associated with the second individual, the second mobile computing device being different from the telematics devices,
wherein identification of the first vehicle, identification of the second vehicle, transmission of the second portion of the insurance policy information to the first mobile computing device, and transmission of the first portion of the insurance policy information to a second mobile computing device occur while drivers of each of the first and second vehicles are at the geographic location of the vehicle incident.

2. The computing device of claim 1 wherein:
the instructions, when executed by the one or more processors, further cause the mobile computing device, responsive to the determination that a vehicle incident has occurred, to
transmit, to the first mobile computing device, a first request for permission to transmit the first portion of the insurance policy information to the second mobile computing device, and
transmit, to the second mobile computing device, a second request for permission to transmit the second portion of the insurance policy information to the first mobile computing device;
wherein:
receipt of the first request at the first mobile computing device causes the first mobile computing device to present the first request at a first display of the first mobile computing device;
receipt of the second request at the second mobile computing device causes the second mobile computing device to present the second request at a second display of the second mobile computing device;
receipt, from the first mobile computing device, of a first response granting the first request causes the computing device to initiate the transmission of the first portion of the insurance policy information to the second mobile computing device; and
receipt, from the second mobile computing device, of a second response granting the second request causes the computing device to initiate the transmission of the second portion of the insurance policy information to the first mobile computing device.

3. The computing device of claim 1 wherein:
the instructions, when executed by one of the processors, further cause the computing device to
transmit a proposed settlement amount to the first mobile computing device wherein receipt of the proposed settlement amount causes the first mobile computing device to present the proposed settlement amount at a first display of the first mobile computing device,
transmit the proposed settlement amount to the second mobile computing device wherein receipt of the proposed settlement amount causes the second mobile computing device to present the proposed settlement amount at a display of the second mobile computing device, and
determine whether the proposed settlement amount has been accepted by the first individual and has been accepted by the second individual,
wherein determining that the first individual and the second individual both accepted the proposed settlement amount causes the computing device to initiate an electronic payment between the first individual and the second individual.

4. The computing device of claim 1 wherein:
the instructions, when executed by the one or more processors, further cause the mobile computing device, responsive to the determination that a vehicle incident has occurred, to
initiate creation of a placeholder insurance claim that identifies the first individual and the second individual, and
populate the placeholder insurance claim with first customer information associated with the first individual and with second customer information associated with the second individual.

5. The computing device of claim 1 wherein:
the instructions, when executed by the one or more processors, further cause the mobile computing device to
(e) receive a share request from a third mobile computing device associated with a third individual, and
(f) responsive to receipt of the share request,
retrieve, from the data store, a third portion of the insurance policy information that is associated with the third individual,
identify a fourth individual to receive the third portion of the insurance policy information based on the share request, and
initiate transmission of the third portion of the insurance policy information to a fourth mobile computing device associated with the fourth individual.

6. The computing device of claim 5 wherein:
the share request includes a vehicle identifier that identifies a vehicle associated with the fourth individual; and
the fourth individual is identified based on the vehicle identifier.

7. An apparatus for identifying vehicles associated with a vehicle incident based on telematics data, the apparatus comprising:
one or more processors; and
memory storing computer-executable instructions that, when executed by at least one of the one or more processors, causes the apparatus to:
(a) receive, from telematics devices of a plurality of vehicles, vehicle telematics information regarding vehicle status and including movement characteristics of a plurality of vehicles,
(b) store the vehicle telematics information,
(c) analyze the vehicle telematics information to determine whether a vehicle incident involving two vehicles has occurred based on the vehicle status and movement characteristics of the plurality of vehicles, and
(d) responsive to a determination that a first vehicle has been involved in the vehicle incident and
prior to identifying a second vehicle involved in the vehicle incident:
identify the first vehicle involved in the vehicle incident as well as a date, a time, one or more vehicle movement characteristics of the first vehicle and a geographic location of the vehicle incident based on the vehicle telematics information received from a telematics device of the first vehicle,
identify a first individual involved in the vehicle incident based on a first portion of the vehicle telematics information received from and specific to the first vehicle of the plurality of vehicles, after identifying the first individual involved in the vehicle incident:

identify the second vehicle involved in the vehicle incident and a second individual associated with the second vehicle based on a second portion of the vehicle telematics information received from and specific to the second vehicle of the plurality of vehicles by comparing telematics data of the first and second vehicles and determining whether each of a second date, a second time, a second vehicle movement characteristic and a second geographic location of the second portion of the vehicle telematics information is similar to or matches the date, the time, at least one of the one or more vehicle movement characteristics and the geographic location of the vehicle incident, respectively, to confirm that the second vehicle was involved in the vehicle incident, retrieve a first portion of insurance policy information that is associated with the first individual and a second portion of the insurance policy information that is associated with the second individual, initiate transmission of the second portion of the insurance policy information to a first mobile computing device associated with the first individual, the first mobile computing device being different from the telematics devices, and initiate transmission of the first portion of the insurance policy information to a second mobile computing device associated with the second individual, the second mobile computing device being different from the telematics devices, wherein identification of the first vehicle, identification of the second vehicle, transmission of the second portion of the insurance policy information to the first mobile computing device, and transmission of the first portion of the insurance policy information to a second mobile computing device occur while drivers of each of the first and second vehicles are at the geographic location of the vehicle incident.

8. The apparatus of claim 7 wherein:
the instructions, when executed by the one or more processors, further cause the apparatus, responsive to the determination that a vehicle incident has occurred, to
transmit, to the first mobile computing device, a first request for permission to transmit the first portion of the insurance policy information to the second mobile computing device, and
transmit, to the second mobile computing device, a second request for permission to transmit the second portion of the insurance policy information to the first mobile computing device;
wherein:
receipt of the first request at the first mobile computing device causes the first mobile computing device to present the first request at a first display of the first mobile computing device;
receipt of the second request at the second mobile computing device causes the second mobile computing device to present the second request at a second display of the second mobile computing device;
receipt, from the first mobile computing device, of a first response granting the first request causes the apparatus to initiate the transmission of the first portion of the insurance policy information to the second mobile computing device; and
receipt, from the second mobile computing device, of a second response granting the second request causes the apparatus to initiate the transmission of the second portion of the insurance policy information to the first mobile computing device.

9. The apparatus of claim 7 wherein:
the instructions, when executed by one of the processors, further cause the apparatus to:
transmit a proposed settlement amount to the first mobile computing device wherein receipt of the proposed settlement amount causes the first mobile computing device to present the proposed settlement amount at a first display of the first mobile computing device,
transmit the proposed settlement amount to the second mobile computing device wherein receipt of the proposed settlement amount causes the second mobile computing device to present the proposed settlement amount at a display of the second mobile computing device, and
determine whether the proposed settlement amount has been accepted by the first individual and has been accepted by the second individual,
wherein determining that the first individual and the second individual both accepted the proposed settlement amount causes the computing device to initiate an electronic payment between the first individual and the second individual.

10. The apparatus of claim 7, wherein:
the instructions, when executed by the one or more processors, further cause the apparatus, responsive to the determination that a vehicle incident has occurred, to:
initiate creation of a placeholder insurance claim that identifies the first individual and the second individual, and
populate the placeholder insurance claim with first customer information associated with the first individual and with second customer information associated with the second individual.

11. The apparatus of claim 7 wherein:
the instructions, when executed by the one or more processors, further cause the apparatus to:
(e) receive a share request from a third mobile computing device associated with a third individual, and
(f) responsive to receipt of the share request:
retrieve a third portion of the insurance policy information that is associated with the third individual,
identify a fourth individual to receive of the insurance policy information based on the share request, and
initiate transmission of the third portion of the insurance policy information to a fourth mobile computing device associated with the fourth individual.

12. The apparatus of claim 11 wherein:
the share request includes a vehicle identifier that identifies a vehicle associated with the fourth individual; and
the fourth individual is identified based on the vehicle identifier.

13. A method comprising:
receiving, by a telematics analysis computing device from telematics devices of a plurality of vehicles, vehicle telematics information regarding vehicle status and including movement characteristics of a plurality of vehicles,
storing, by the telematics analysis computing device, the vehicle telematics information,
analyzing, by the telematics analysis computing device, the vehicle telematics information to determine whether a vehicle incident involving two vehicles has occurred based on the vehicle status and movement characteristics of the plurality of vehicles,
responsive to a determination that a first vehicle has been involved in the incident and prior to identifying a second vehicle involved in the vehicle incident:
  identifying, by the telematics analysis computing device, the first vehicle involved in the vehicle incident as well as a date, a time, one or more vehicle movement characteristics of the first vehicle and a geographic location of the vehicle incident based on the vehicle telematics information received from a telematics device of the first vehicle,
  identifying, by the telematics analysis computing device, a first individual involved in the vehicle incident based on a first portion of the vehicle telematics information received from and specific to the first vehicle of the plurality of vehicles,
after identifying the first individual involved in the vehicle incident:
  identifying, by the telematics analysis computing device, the second vehicle involved in the vehicle incident and a second individual associated with the second vehicle based on a second portion of the vehicle telematics information received from and specific to the second vehicle of the plurality of vehicles by comparing telematics data of the first and second vehicles and determining whether each of a second date, a second time, a second vehicle movement characteristic and a second geographic location of the second portion of the vehicle telematics information is similar to or matches the date, the time, at least one of the one or more vehicle movement characteristics and the geographic location of the vehicle incident, respectively, to confirm that the second vehicle was involved in the vehicle incident,
  retrieving a first portion of insurance policy information that is associated with the first individual and a second portion of the insurance policy information that is associated with the second individual,
  initiating transmission of the second portion of the insurance policy information to a first mobile computing device associated with the first individual, the first mobile computing device being different from the telematics devices, and
  initiating transmission of the first portion of the insurance policy information to a second mobile computing device associated with the second individual, the second mobile computing device being different from the telematics devices,
wherein identification of the first vehicle, identification of the second vehicle, transmission of the second portion of the insurance policy information to the first mobile computing device, and transmission of the first portion of the insurance policy information to a second mobile computing device occur while drivers of each of the first and second vehicles are at the geographic location of the vehicle incident.

14. The method of claim 13, further comprising:
responsive to the determination that a vehicle incident has occurred:
  transmitting, to the first mobile computing device, a first request for permission to transmit the first portion of the insurance policy information to the second mobile computing device, and
  transmitting, to the second mobile computing device, a second request for permission to transmit the second portion of the insurance policy information to the first mobile computing device,
wherein:
  receipt of the first request at the first mobile computing device causes the first mobile computing device to present the first request at a first display of the first mobile computing device;
  receipt of the second request at the second mobile computing device causes the second mobile computing device to present the second request at a second display of the second mobile computing device;
  receipt, from the first mobile computing device, of a first response granting the first request causes the computing device to initiate the transmission of the first portion of the insurance policy information to the second mobile computing device; and
  receipt, from the second mobile computing device, of a second response granting the second request causes the computing device to initiate the transmission of the second portion of the insurance policy information to the first mobile computing device.

15. The method of claim 13, further comprising:
transmitting a proposed settlement amount to the first mobile computing device wherein receipt of the proposed settlement amount causes the first mobile computing device to present the proposed settlement amount at a first display of the first mobile computing device,
transmitting the proposed settlement amount to the second mobile computing device wherein receipt of the proposed settlement amount causes the second mobile computing device to present the proposed settlement amount at a display of the second mobile computing device, and
determining whether the proposed settlement amount has been accepted by the first individual and has been accepted by the second individual,
wherein determining that the first individual and the second individual both accepted the proposed settlement amount causes the computing device to initiate an electronic payment between the first individual and the second individual.

16. The method of claim 13, further comprising:
responsive to the determination that a vehicle incident has occurred:
  initiating creation of a placeholder insurance claim that identifies the first individual and the second individual, and
  populating the placeholder insurance claim with first customer information associated with the first individual and with second customer information associated with the second individual.

17. The method of claim 16, further comprising:
receiving a share request from a third mobile computing device associated with a third individual, and responsive to receipt of the share request:
  receiving a third portion of the insurance policy information that is associated with the third individual,
  identifying a fourth individual to receive the third portion of the insurance policy information based on the share request, and
  initiating transmission of the third portion of the insurance policy information to a fourth mobile computing device associated with the fourth individual.

18. The method of claim 17 wherein:
the share request includes a vehicle identifier that identifies a vehicle associated with the fourth individual; and
the fourth individual is identified based on the vehicle identifier.

* * * * *